(12) United States Patent
Akema et al.

(10) Patent No.: US 7,537,028 B2
(45) Date of Patent: May 26, 2009

(54) DEVICE FOR FLUID PROCESSOR AND ITS FLUID FLOW PATH SETTING DEVICE, FLUID PROCESSOR, AND FLUID PROCESSING METHOD

(75) Inventors: Hiroshi Akema, Tokyo (JP); Tsuyoshi Yamakoshi, Tokyo (JP)

(73) Assignee: JSR Corporation, Tokyo (JP)

( * ) Notice: Subject to any disclaimer, the term of this patent is extended or adjusted under 35 U.S.C. 154(b) by 516 days.

(21) Appl. No.: 10/514,720

(22) PCT Filed: May 27, 2003

(86) PCT No.: PCT/JP03/06592

§ 371 (c)(1),
(2), (4) Date: Nov. 23, 2004

(87) PCT Pub. No.: WO03/099428

PCT Pub. Date: Dec. 4, 2003

(65) Prior Publication Data

US 2005/0161099 A1    Jul. 28, 2005

(30) Foreign Application Priority Data

May 28, 2002    (JP)    ............................... 2002-154124

(51) Int. Cl.
*F15C 1/04* (2006.01)
(52) U.S. Cl. .................... 137/827; 137/831; 251/129.01
(58) Field of Classification Search ................. 137/825, 137/827, 831; 251/129.01
See application file for complete search history.

(56) References Cited

U.S. PATENT DOCUMENTS 2,056,322 A  *  10/1936  Hoppe .................... 251/129.14

(Continued)

FOREIGN PATENT DOCUMENTS

JP    2001-70784    3/2001

(Continued)

*Primary Examiner*—Stephen M Hepperle
*Assistant Examiner*—Craig M Schneider
(74) *Attorney, Agent, or Firm*—Oblon, Spivak, McClelland, Maier & Neustadt, P.C.

(57) ABSTRACT

A device for fluid processor comprises a plate-shaped base material, a micro conduit network formed in the base material and formed of a first micro conduit and second micro conduits intersecting with the first micro conduit, a valve provided in each of conduit portions and a valve control mechanism. The valves in the conduit portions are closed, whereby a fluid running route is set, thereby forming a fluid processor that an intended processing is conducted by circulating a fluid through the running route. A fluid suspending cavity is preferably formed at each of the intersections of the micro conduits.

A fluid running route setting apparatus is equipped with a conduit portion opening and closing mechanism having a function that individual valve control mechanisms in the device are driven, and the conduit portion opening and closing mechanism is driven by indication of fluid running route setting to a computer.

A fluid processor may be provided with a stimulus application mechanism for applying stimulus to a fluid in the micro conduit or fluid suspending cavity in the device.

In the fluid processor that a fluid to be processed is liquid, the running route for fluid process is set corresponding to objective processing time, the fluid to be processed is passed through a temporary running route, thereby finding passing time, and a corrected running route for fluid process is set by this time.

4 Claims, 13 Drawing Sheets

U.S. PATENT DOCUMENTS

| | | | | |
|---|---|---|---|---|
| 3,443,585 | A * | 5/1969 | Reinicke | 137/595 |
| 3,942,559 | A * | 3/1976 | Kranz et al. | 137/831 |
| 4,393,897 | A * | 7/1983 | Izumi et al. | 137/831 |
| 4,489,863 | A * | 12/1984 | Horchos et al. | 222/504 |
| 4,556,195 | A * | 12/1985 | Calkins | 251/129.2 |
| 4,655,247 | A * | 4/1987 | Westra et al. | 137/519.5 |
| 5,400,967 | A * | 3/1995 | Yu | 239/106 |
| 5,509,439 | A * | 4/1996 | Tantardini | 137/269 |
| 5,527,295 | A * | 6/1996 | Wing | 604/254 |
| 6,095,189 | A * | 8/2000 | Ben-Shalom | 137/606 |
| 6,347,645 | B2 * | 2/2002 | Gurubatham et al. | 137/831 |
| 6,802,489 | B2 * | 10/2004 | Marr et al. | 251/129.14 |
| 7,080,664 | B1 * | 7/2006 | Ayer | 137/832 |
| 2002/0028504 | A1 | 3/2002 | MacCaskill et al. | |

FOREIGN PATENT DOCUMENTS

| | | |
|---|---|---|
| JP | 2002-66999 | 3/2002 |
| JP | 2002-282682 | 10/2002 |
| JP | 2003-084001 | 3/2003 |

\* cited by examiner

DEVICE FOR FLUID PROCESSOR AND ITS FLUID FLOW PATH SETTING DEVICE, FLUID PROCESSOR, AND FLUID PROCESSING METHOD

TECHNICAL FIELD

The present invention relates to a device for forming a fluid processor that passage of a liquid or gaseous fluid is controlled in a micro conduit, for example, a fluid processor useful as a micro reactor for conducting a liquid chemical reaction or the like by setting a liquid running route, and a running route setting apparatus for setting a fluid running route in the device for fluid processor. The present invention also relates to a fluid processor and a fluid processing method.

BACKGROUND ART

Recently, attention has been attracted to a micro reactor for reacting a very small quantity of liquid reagents, because not only it has such merits, due to its small size, that only a minute amount of liquid reagents are required for conducting an expected reaction, but also the time required for the reaction may be extremely short, and so it is extremely convenient to, for example, a bioassay or the like in a medical field of which rapidness is required.

However, types of micro reactions to be actually conducted vary extremely a lot according to the end objects thereof. For example, the simplest reaction is a reaction that 2 liquids for reaction are brought into simple contact with each other. However, it may be demanded in some cases to conduct a plurality of contact reactions successively or repeatedly.

As the micro reactor for conducting a micro reaction, has been proposed a reactor in which micro conduits, may be called as "micro channels", have been formed in a plate-shaped base material.

However, the conventional micro reactor is constructed for conducting a micro reaction of a specific type. Accordingly, it cannot naturally be applied to a micro reaction of different type.

Since the conventional micro reactors are provided as those for exclusive types as described above, a great variety of micro reactors must be provided in advance according to the required types of micro reactions when it is demanded to conduct micro reactions of many types. This is unavoidably accompanied by great inefficiency.

In some micro reactions, a partial change may be desired in many cases. However, the conventional micro reactors cannot meet such a request because the reaction route thereof is fixed.

DISCLOSURE OF THE INVENTION

The present invention has been made on the basis of the foregoing circumstances and has as its basic object the provision of a device for fluid processor for forming a fluid processor that passage of a fluid in each conduit portion has been controlled in a micro conduit formed of plurality of conduit portions.

It is a principal object of the present invention to provide a device for fluid processor, which has the so-called general-purpose fluid conduit system and can set a required fluid running route with a great degree of freedom, according to the details of the process to be conducted.

Another object of the present invention is to provide a running route setting apparatus for setting a fluid running route, through which a fluid is to be actually passed in the device for fluid processor of the above-described construction.

A further object of the present invention is to provide a fluid processor obtained by the device for fluid processor as described above.

An object of the present invention is to provide a fluid processor by which a fluid running route is set according to a fluid process to be conducted in the device for fluid processor, and stimulus can be applied to a fluid to be processed in this fluid running route according to the fluid process.

An object of the present invention is to provide a fluid processing method by a fluid processor, by which a running route for fluid process can be set according to the length of objective processing time to conduct an intended process to a fluid to be processed in an actual device for fluid processor, and an expected process to the fluid to be processed can be surely conducted by a fluid processor obtained.

Another object of the present invention is to provide a fluid processing method by a fluid processor, by which a running route for fluid process, through which actual fluid passing time will become objective processing time, can be set according to the length of the objective processing time to conduct an intended process to a fluid to be processed in an actual device for fluid processor, and the intended process to the fluid to be processed can be strictly and precisely conducted by a fluid processor thus obtained.

SUMMARY OF THE INVENTION

[1] A device for fluid processor according to the present invention comprises a plate-shaped base material, a micro conduit for passing fluid formed in the base material so as to extend in a plane direction thereof, a valve provided in the micro conduit for closing the micro conduit and a valve control mechanism for controlling the valve between closed and opened states, wherein the state of the valve is controlled by the valve control mechanism, so that a fluid processor in which the operating state of the micro conduit has been set is formed.

[2] A device for fluid processor according to the present invention comprises;

a plate-shaped base material;

a micro conduit network formed of micro conduits through which a fluid is to be passed and formed in the base material, wherein the micro conduit network has at least one first micro conduit and at least two second micro conduits each intersecting with the first micro conduit;

a valve provided in each of a plurality of conduit portions extending from each of the intersections of the micro conduits in the micro conduit network, for closing the conduit portions; and a valve control mechanism provided to control each of the valves between closed and opened states, wherein valves related to other conduit portions than conduit portions selected are set to a closed state, whereby a fluid running route having at least one fluid inlet and at least one fluid outlet continuously linked with the fluid inlet is set, thereby a fluid processor is formed, with which an intended process is conducted by passing the fluid through the fluid running route set.

[3] A device for fluid processor according to the present invention comprises;

a plate-shaped base material;

a micro conduit network formed of micro conduits through which a fluid is to be passed and formed in the base material wherein the micro conduit network has at least one first micro conduit and at least two second micro conduits each intersecting with the first micro conduit;

a fluid suspending cavity formed at the intersections of the first micro conduit and the second micro conduits, and formed of a space of a diameter greater than those of conduit portions related to the intersection, for temporally suspending and retaining the fluid from the conduit portion;

a valve provided in each of a plurality of conduit portions extending from each of the fluid suspending cavities, for closing the conduit portions; and a valve control mechanism provided to control each of the valves between closed and opened states, wherein valves related to other conduit portions than conduit portions selected are set to a closed state, whereby a fluid running route having at least one fluid inlet and at least one fluid outlet continuously linked with the fluid inlet is set, thereby a fluid processor is formed with which an intended process is conducted by passing the fluid through the fluid running route set.

[4] In each of the devices for fluid processor as described above, the each of valves may have a valve chamber formed in the micro conduit and a valve particle arranged in the valve chamber, and the valve control mechanism may be that has a function that the valve particle is driven in the valve chamber, whereby an opening of the micro conduit continuously linked with the valve chamber is set to a closed state or an opened state.

[5] The valve control mechanism may be a magnetic field applying mechanism that a magnetic field is applied on a valve particle having magnetism or an electric field applying mechanism that an electric field is applied on a valve particle having a charge.

[6] A fluid running route setting apparatus of a device for fluid processor according to the present invention is a fluid running route setting apparatus for the device for fluid processor according to the item [2], which comprises:

a conduit portion opening and closing mechanism having a function that individual valve control mechanisms related to all the valves in the device for fluid processor are driven, and a computer in which information as to the micro conduit network of the device for fluid processor and information as to positions of the valves have been stored, wherein the conduit portion opening and closing mechanism is driven by a signal for setting the fluid running route to the computer in such a manner that valves related to other conduit portions than conduit portions selected become a closed state.

[7] A fluid processor according to the present invention, wherein in the device for fluid processor according to the item [2], a fluid running route having at least two fluid inlets is set, thereby constructing a micro reactor that fluids entered from the two fluid inlets are brought into contact with each other at the intersect.

[8] A fluid processor according to the present invention comprises a plurality of the fluid processors according to the item [7] connected to each other, wherein a fluid discharged from one fluid processor is fed to a fluid processor subsequent thereto.

[9] A fluid processor according to the present invention comprises a device for fluid processor equipped with a plate-shaped base material, a first micro conduit formed in the base material through which a fluid is to be passed, a second micro conduit intersecting with the first micro conduit, a valve for closing each of a plurality of conduit portions extending from the intersection of the first micro conduit and the second micro conduit, and a valve control mechanism for controlling each of the valves between closed and opened states, wherein a stimulus application mechanism for applying stimulus to a fluid in a micro conduit in the device for fluid processor is provided.

A fluid processor according to the present invention comprises a advice for fluid processor equipped with a plate-shaped base material, a first micro conduit formed in the base material through which a fluid is to be passed, a second micro conduit intersecting with the first micro conduit, a fluid suspending cavity formed at intersection of the first micro conduit and the second micro conduit and formed of a space of a diameter greater than those of conduits portions related to the intersection, in which the fluid from a conduit portion is temporally suspended and retained, a valve for closing each of a plurality of conduit portions extending from each of the fluid suspending cavities, and a valve control mechanism for controlling each of the valves between closed and opened states, wherein a stimulus application mechanism for applying stimulus to a fluid running in the micro conduit and/or being suspended in the fluid suspending cavity of the device for fluid processor is provided.

[11] In each of the fluid processors described above, the stimulus application mechanism may be at least one of a thermal stimulus application mechanism and a radiative stimulus application mechanism.

[12] The stimulus application mechanism may be a thermal stimulus application mechanism, and the thermal stimulus application mechanism may be formed of a heat exchange medium circulating path formed in the base material in a state close to at least a part of the micro conduits and/or the fluid suspending cavities in the device for fluid processor, to which a heat exchange medium is fed.

[13] A fluid processor according to the present invention comprises a plurality of the devices for fluid processor according to the item [2] or [3] and a stimulus application mechanism common to the devices for fluid processor.

[14] In the fluid processor described above, the stimulus application mechanism may be at least one of a thermal stimulus application mechanism and a radiative stimulus application mechanism.

[15] A fluid processor according to the present invention comprises a plurality of the devices according to the item [2] or [3] connected to each other, and a stimulus application mechanism provided in at least one of the devices for fluid processor, wherein a fluid discharged from one fluid processor is fed to a fluid processor subsequent thereto.

[16] The stimulus application mechanism may be at least one of a thermal stimulus application mechanism and a radiative stimulus application mechanism.

[17] A fluid processing method by a fluid processor according to the present invention comprises;

using a device for fluid processor comprising a plate-shaped base material, a micro conduit network formed of micro conduits through which a fluid is to be passed and formed in the base material, wherein the micro conduit network has at least one first micro conduit and at least two second micro conduits each intersecting with the first micro conduit, a valve provided in each of a plurality of conduit portions extending from each of the intersections of the micro conduits in the micro conduit network, for closing the conduit portions, and a valve control mechanism provided to control each of the valves between closed and opened states;

constructing a fluid processor by controlling valves related to other conduit portions than conduit portions selected to a closed state according to the length of objective processing time suitable for an intended process of a fluid to be processed in the device for fluid processor, whereby setting a running route for fluid process having at least one fluid inlet and at least one fluid outlet continuously linked with the fluid inlet; and passing the fluid to be processed through the running route for fluid process of the fluid processor, thereby conducting an intended process as to the fluid to be processed.

[18] A fluid processing method by a fluid processor according to the present invention comprises;

using a device for fluid processor comprising a plate-shaped base material, a micro conduit network formed of micro conduits through which a fluid is to be passed and formed in the base material, wherein the micro conduit network has at least one first micro conduit and at least two second micro conduits each intersecting with the first micro conduit, a valve provided in each of a plurality of conduit portions extending from each of the intersections of the micro conduits in the micro conduit network, for closing the conduit portions, and a valve control mechanism provided to control each of the valves between closed and opened states;

constructing a precursor fluid processor by controlling valves related to other conduit portions than conduit portions selected to a closed state according to the length of objective processing time suitable for an intended process of a fluid to be processed in the device for fluid processor, whereby setting a temporary running route having at least one fluid inlet and at least one fluid outlet continuously linked with the fluid inlet;

constructing a fluid processor in which a running route for fluid process is set by passing the fluid to be processed through the temporary running route of the precursor fluid processor to find the passing time required for the fluid to be processed to pass through the temporary running route and comparing the passing time with the objective processing time to correct at least a part of the temporary running route according to a difference between the passing time and the objective processing time; and passing the fluid to be processed through the running route for fluid process of the fluid processor, thereby conducting an intended process as to the fluid to be processed.

[19] In the fluid processing method described above, the passing time of the fluid to be processed may be found by a velocity of the out flowing fluid from the fluid outlet of the temporary running route and a volume of the temporary running route.

[20] In the fluid processing method, the intended process as to the fluid to be processed may be a mixing process, reaction process, thermal process or radiation irradiation process.

[21] In the fluid processing method, a fluid suspending cavity formed of a space having a diameter greater than those of conduit portions related to the intersections of the first micro conduit and the second micro conduits, in which the fluid from a conduit portion is temporally suspended and retained, may be formed at each of the intersections in the device for fluid processor.

[Effect of the Invention]

According to the device (hereinafter may be referred to as "device" merely) for fluid processor of the present invention, there is provided a fluid processor that passage of a fluid in a micro conduit has been controlled by the valve control mechanism in the micro conduit.

According to the device of the present invention, a fluid running route can be set with a great degree of freedom by selectively controlling the states of valves related to the micro conduits making up the micro conduit network. As a result, a fluid processor, which will become, for example, a micro reactor capable of conducting a desired process, can be provided by the fluid running route thus obtained.

In other words, the devices according to the present invention have the so-called general-purpose fluid conduit system and can set a necessary reaction route according to the type of a process to be conducted, so that a fluid processor adapted to an intended process is formed.

According to the construction that the fluid suspending cavity has been formed at an intersection of the first micro conduit and the second micro conduit in the device, an effective contact action, mixing action or agitating action is achieved as to 2 fluids to be processed, and a sufficient contact process can be performed.

According to the running route setting apparatus of the present invention, a fluid processor capable of suitably conducting a desired process can be easily provided by processing a signal for setting a fluid running route in the computer to set a suitable fluid running route in the device.

The fluid processors according to the present invention are formed by the respective devices described above and useful as, in particular, micro reactors.

The fluid processor of the present invention is equipped with the device, which has the micro conduit network and can selectively set a fluid running route, and the device is equipped with the stimulus application mechanism, whereby a variety of stimuli is applied to a fluid to be processed in a fluid running route and/or a fluid suspending cavity in a manner depending on the intended micro-fluid process, so that setting of process conditions can be executed corresponding to the intended micro-fluid process. Accordingly, the micro-fluid process can be conducted with an extremely great degree of freedom and high efficiency, and more over, a variety of micro-fluid process can also be conducted.

According to the fluid processing method by a fluid processor of the present invention, a running route for fluid process is set according to the length of objective processing time to conduct an intended process to a fluid to be processed in the device having a micro conduit network capable of selectively setting a fluid running route, thereby forming a fluid processor, and a process to the fluid to be processed can be conducted by this fluid processor. Therefore, the fluid to be processed is passed in a state that the passing time thereof has been strictly and precisely controlled. As a result, the actual processing time of the fluid to be processed can be made to be substantially same with the objective processing time, and an expected process can thus be surely conducted on a minute amount of the fluid to be processed.

In the device, a precursor fluid processor that a temporary running route has been set according to the length of objective processing time is formed to find the passing time required for the fluid to be processed to pass through the temporary running route, and the passing time is compared with the objective processing time to correct, for example, at least a part of the temporary running route, thereby forming a fluid processor in which a running route for fluid process has been set. Therefore, a state that the actual processing time of the fluid to be processed has been made to substantially match with the objective processing time is realized by using this fluid processor, and an expected process can thus be surely conducted on a minute amount of the fluid to be processed.

In the above, the passing time of the fluid to be processed is found by a velocity of the out flowing fluid from the fluid outlet of the temporary running route and a volume of the temporary running route, whereby a running route for fluid process in a state that the length of the passing time is strictly and precisely same with the objective processing time can be set.

The intended process as to the fluid to be processed may be a reaction process, thermal process or radiation irradiating process of plural kinds of fluids, whereby the expected process of the fluid to be processed can be conducted in a length of time corresponding to the objective processing time.

DESCRIPTION OF CHARACTERS

Figure 1:
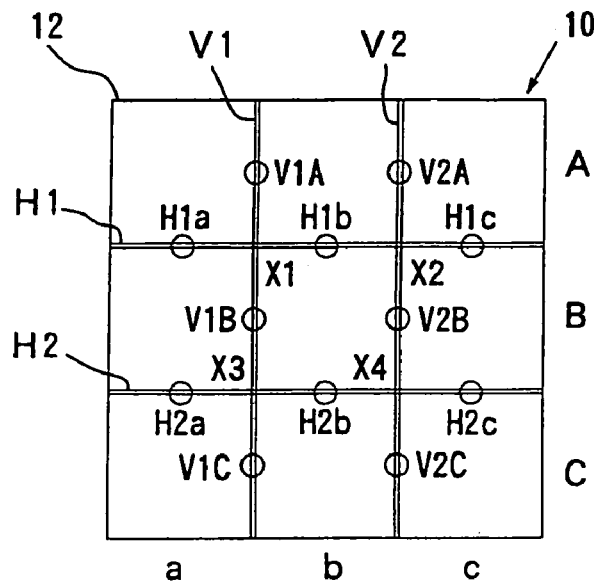
FIG. 1 typically illustrates an example of the construction of a device according to the present invention used as a micro reactor.

10 Device for fluid processor
12 Base material
13 Heat exchange medium circulating path
13$i$ Opening for feed
13$o$ Opening for discharge
H1, H2 Lateral micro conduits
V1, V2 Vertical micro conduits
H1$i$, H2$i$ Openings
H1$o$, H2$o$ Openings
V1$i$, V2$i$ Openings
V1$o$, V2$o$ Openings
X1-X4 Intersections
A, B, C Regions
a, b, c Regions
H1$a$-H1$c$, H2$a$-H2$c$ Valves
V1A-V1C, V2A-V2C Valves
20 Spherical space (valve chamber)
22 One pore
24 The other pore
22A Main portion
22B Curved portion
23, 25 Openings
28 Valve ball
30 Magnetizable film
31 Microspace portion
35A, 35B Vertical micro conduits
36A, 36B Lateral micro conduits
40A, 40B, 40C, 40D, 40E Fluid processors
XA1-XA4, XB1-XB4, XC1-XC4 Fluid suspending cavities
XD1-XD4, XE1-XE4 Fluid suspending cavities
A1$i$, A2$i$, C1$i$, D1$i$, E1$o$ Openings
LH Lateral micro conduit
LV Vertical micro conduit
X Intersection
LS Conduit portion
S Fluid suspending cavity
V Valve
22, 24 Pores
50 Fluid processor
E1, E2 Fluid inlets
EX Fluid outlet

BEST MODE FOR CARRYING OUT THE INVENTION

Embodiments of the present invention will hereinafter be described in detail.

[Device for Fluid Processor]

FIG. 1 typically illustrates an example of the construction of a device 10 for fluid processor according to the present invention used as, for example, a micro reactor.

In FIG. 1, reference numeral 12 is a plate-shaped base material in the form of a rectangle as a whole, and a material not impeding an intended process such as a micro reaction, such as glass, a resin or a metal is used. However, the resin is particularly preferably used from the viewpoint of easy production.

In an embodiment in FIG. 1, a plurality of micro conduits (drawn by a double line) are formed in a state intersecting with each other in the base material 12 so as to extend in a plane direction in the form of a tunnel within the body part of the base material 12, and a micro conduit network is formed by these conduits.

Specifically, 2 lateral micro conduits H1 and H2 each extending in a horizontal direction and opened at the both ends thereof at both left and right side edges of the base material are formed in a state separated from each other in a vertical direction, and 2 vertical micro conduits V1 and V2 each extending in a vertical direction and opened at the both ends thereof at both top and bottom side edges of the base material are formed in a state separated from each other in a lateral direction, so that 4 intersections X1 to X4 in total are formed.

In other words, the upper lateral micro conduit (hereinafter referred to as "upper lateral conduit") H1 and the left side vertical micro conduit (hereinafter referred to as "left side vertical conduit") V1 intersect at an intersection X1, the upper lateral conduit H1 and the right side vertical micro conduit (hereinafter referred to as "right side vertical conduit") V2 intersect at an intersection X2, the lower lateral micro conduit (hereinafter referred to as "lower lateral conduit") H2 and the left side vertical conduit V1 intersect at an intersection X3, and the lower lateral conduit H2 and the right side vertical conduit V2 intersect at an intersection X4.

A valve is provided in each of 3 conduit portions formed by dividing each of the upper lateral conduit H1, lower lateral conduit H2, left side vertical conduit V1 and right side vertical conduit V2 by the 2 intersections on said conduit, for closing and opening the conduit portion.

In the illustrated embodiment, 3 regions partitioned by the upper lateral conduit H1 and lower lateral conduit H2 and line up vertically are regarded as A, B and C in order from the top, and 3 regions partitioned by the left side vertical conduit V1 and right side vertical conduit V2 and line up laterally are regarded as a, b and c in order from the left. Each valve is identified by writing both characters of a micro conduit and a region, in which the valve is located.

For example, a valve in a conduit portion in the left region of the upper lateral conduit H1 is expressed as "valve H1a".

Accordingly, valves H1a, H1b and H1c are provided in the respective conduit portions of the upper lateral conduit H1, valves H2a, H2b and H2c are provided in the respective conduit portions of the lower lateral conduit H2, valves V1A, V1B and V1C are provided in the respective conduit portions of the left side vertical conduit V1, and valves V2A, V2B and V2C are provided in the respective conduit portions of the right side vertical conduit V2.

Figure 2:
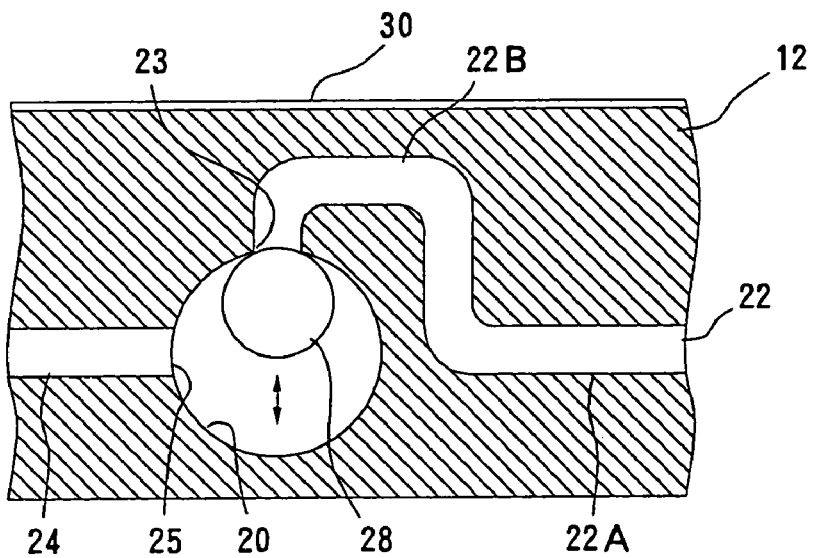
FIG. 2 is a cross sectional view illustrating an example of the specific construction of a valve in the device according to the present invention.

FIG. 2 is a cross sectional view illustrating the specific construction of a valve. A hatched portion is a body part of the base material 12.

A spherical space 20 forming a valve chamber and having a relatively large inner diameter is formed in the body part of the base material 12, and a conduit portion is formed by one pore 22 and the other pore 24 which are communicated with each other by being opened to the spherical space 20.

One pore 22 has a main portion 22A extending along the surface of the base material 12 and a U-shaped curved portion 22B connected to the main portion 22A, and the curved portion 22B communicates with the spherical space 20 through a circular opening 23 at the upper portion of the spherical space 20. A peripheral edge of the opening 23 acts as a valve seat. The other pore 24 extends along the surface of the base material 12 and communicates with a side portion of the spherical space 20 at an opening 25.

Within the spherical space 20 is arranged a valve ball 28 having an outer diameter greater than any opening diameter of the opening 23 related to one pore 22 and the opening 25 related to the other pore 24 and making up a valve particle which will become a valve disk of the valve. The valve ball 28 is composed of a magnetic field-sensitive substance, for example, a ferromagnetic substance such as iron, nickel or cobalt. A magnetizable film 30 for moving the valve ball 28 in a thickness-wise direction of the base material 12 is provided on the whole surface of the base material 12.

In this embodiment, an elastic coating layer composed of an elastic substance may also be formed on the surface of the valve ball 28. According to the valve ball having the elastic coating layer, high gas-tightness in the valve is ensured even when a fluid to be processed is gaseous, since the elastic coating layer acts as a packing for seal.

As a material of such an elastic substance, may be used a substance which has suitable elasticity and does not adversely affect a fluid to be processed.

When the magnetizable film 30 is magnetized at a portion correspondingly facing to any spherical space 20, the valve ball 28 in the spherical space 20 is pressed against a peripheral edge of the opening 23 related to one pore 22 by attraction force by virtue of an effect of a magnetic field generated at this portion as the result thereof, whereby the opening 23 is closed, and the direct link between said one pore 22 and the spherical space 20 is shut off, so that passage of a fluid through this conduit portion is prohibited. In other words, the magnetizable film 30 has an effect as a valve control mechanism to the valve, and the valve that has been in an opened state is set to a closed state by driving this valve control mechanism. The valve set to the closed state once retains the closed state as it is until the portion is demagnetized.

As the magnetizable film 30, may be used a card writer used in process of a magnetic card or that according to the memory system of a hard disk drive in a computer.

Figure 3:
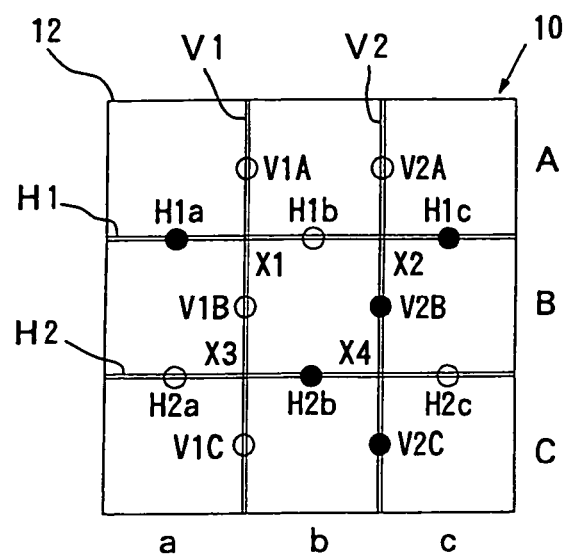
FIG. 3 illustrates a state that other valves than those selected have been closed in the device shown in FIG. 1.

In an embodiment in FIG. 3, valves H1a, H1c, H2b, V2B and V2C are driven and set to a closed state, and other valves than these are set to an opened state.

Figure 4:
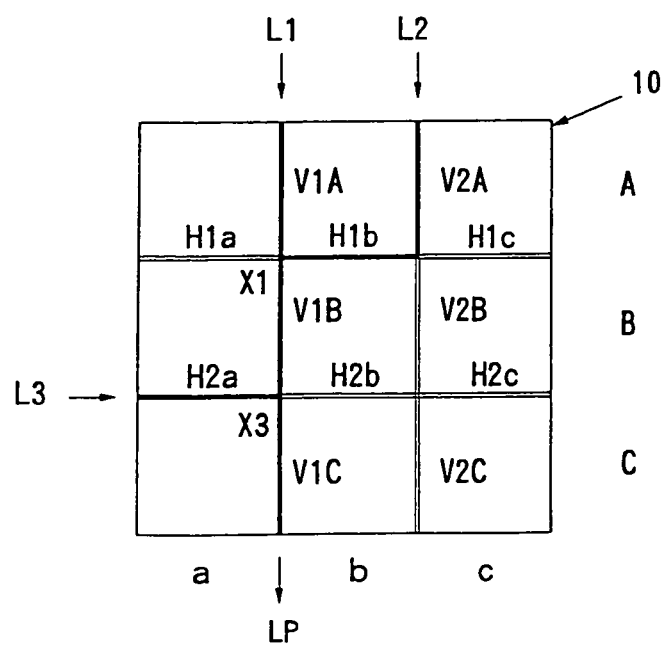
FIG. 4 illustrates a fluid running route set by being made the state in FIG. 3 in the device shown in FIG. 1.

In this embodiment, passage of a fluid is prohibited at conduit portions H1a and H1c of the upper lateral conduit H1, conduit portions H2b and H2c of the lower lateral conduit H2, and conduit portions V2B and V2C of the right side vertical conduit V2 indicated by a double line as illustrated in FIG. 4, and a state that passage of the fluid becomes feasible is formed at a conduit portion H1b of the upper lateral conduit H1, a conduit portion H2a of the lower lateral conduit H2, all conduit portions V1A, V1B and V1C of the left side vertical conduit V1, and a conduit portion V2A of the right side vertical conduit V2.

This state is a fluid processor that a fluid running route has been set. Accordingly, when fluids L1, L2 and L3 are fed to flow into the conduit portions V1A, V2A and H2a from openings in an outer peripheral edge of the base material 12, respectively, the fluids L1 and L2 join at the intersection X1, come into contact with each other and flow through the conduit portion V1B in a mixed state. At the intersection X3, the fluid L3 is further added. Thereafter, the mixed fluid flows through the conduit portion V1C, and discharged as a discharge fluid LP from an opening in the outer periphery of the base material 12.

In this embodiment, a micropump or the like may be used for feeding the fluids to flow into the conduit portions from the openings in the outer periphery of the base material 12.

Accordingly, when liquid reaction reagents R1, R2 and R3 are used as the fluids L1, L2 and L3, the discharge fluid LP contains a reaction product P according to the following reaction formulae (1) and (2). More specifically, the liquid reaction reagents R1 and R2 react with each other to form an intermediate product R12. The liquid reaction reagent R3 is further added to this intermediate product to obtain a final product P.

$$R1+R2 \rightarrow R12 \qquad \text{Reaction formula (1)}$$

$$R12+R3 \rightarrow P \qquad \text{Reaction formula (2)}$$

In the device 10 of the above-described construction, valves related to other conduit portions than selected conduit portions can be set to a closed state, so that suitable conduit portions are selected, whereby any fluid running route can be set by the conduit portions thus selected.

Figure 5:
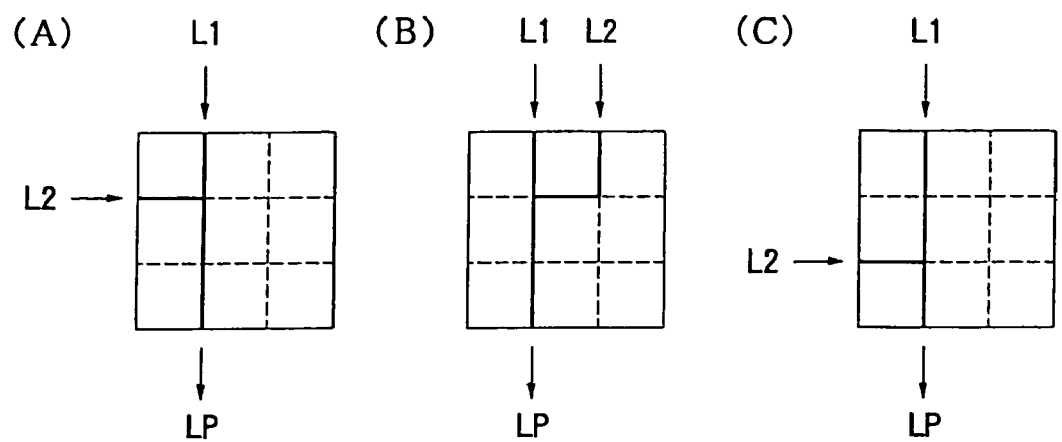
FIGS. 5(A) to (C) illustrate examples where various fluid running routes have been set for the purpose of obtaining a discharge fluid by bringing 2 kinds of fluids into contact with each other in the device shown in FIG. 1.

FIGS. 5(A) to (C) illustrate examples where various fluid running routes have been set for the purpose of obtaining a discharge fluid LP by bringing 2 fluids L1 and L2 into contact with each other in the device 10 of the above. According to fluid running routes shown in FIGS. 5(A) and (B), the fluids L1 and L2 pass 2 conduit portions after contact, so that contact time longer than that is achieved in a fluid running route shown in FIG. 5(C) is achieved. Such a route is thus useful in the case where long reaction time is required.

Figure 6:
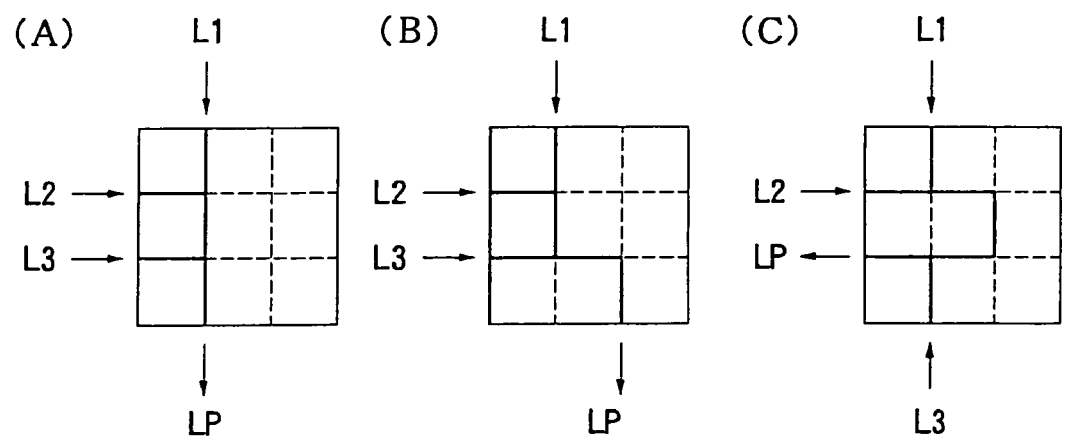
FIGS. 6(A) to (C) illustrate examples of other fluid running routes in the device shown in FIG. 1.

FIGS. 6(A) to (C) illustrate examples of other fluid running routes in the device 10. In these examples, fluid running routes for bring 2 fluids L1 and L2 into contact with each other to obtain a mixed fluid (L12), and bring a further fluid L3 into contact with this mixed fluid to obtain a discharge fluid LP are set. According to the fluid running route shown in FIG. 6(B), long contact time is obtained after the fluid L3 is brought into contact.

According to the fluid running route shown in FIG. 6(C), long contact time is obtained until the fluid L3 is brought into contact after the fluids L1 and L2 are brought into contact with each other.

Figure 7:
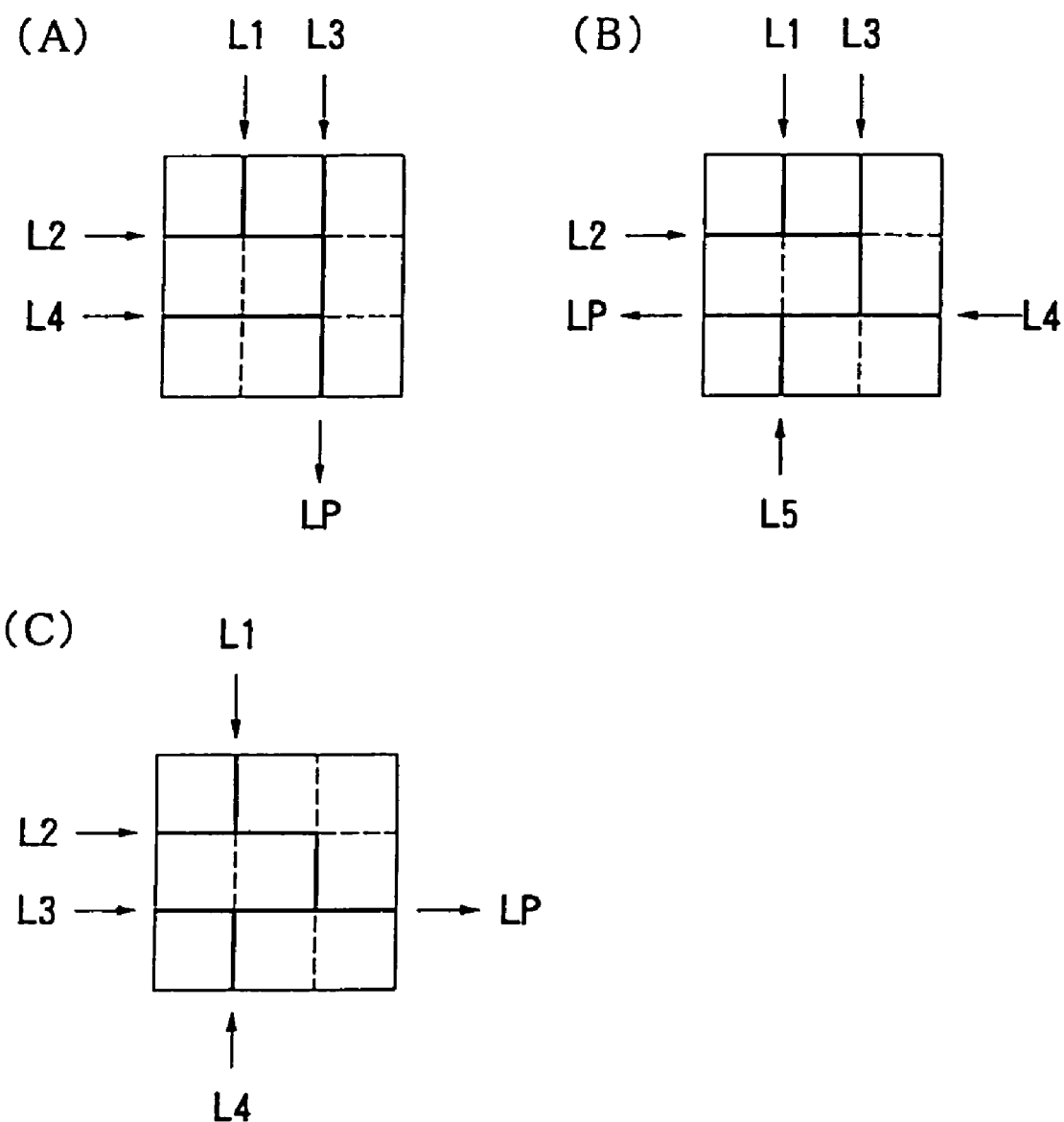
FIGS. 7(A) to (C) illustrate examples of further fluid running routes in the device shown in FIG. 1.

FIG. 7(A) illustrates an example of a further fluid running route in the device 10. In this example, a fluid running route for bring 2 fluids L1 and L2 into contact with each other to obtain a mixed fluid (L12), bring a further fluid L3 into contact with this mixed fluid to obtain a mixed fluid (L123) and bring a still further fluid L4 into contact with this mixed fluid to obtain a discharge fluid LP is set.

FIG. 7(B) illustrates an example of a still further fluid running route in the device 10. In this example, a fluid running route for bring 2 fluids L1 and L2 into contact with each other to obtain a mixed fluid (L12), bring a further fluid L3 into contact with this mixed fluid to obtain a mixed fluid (L123), bring a still further fluid L4 into contact with this mixed fluid to obtain a mixed fluid (L1234) and then bring a yet still further fluid L5 into contact with this mixed fluid to obtain a discharge fluid LP is set.

FIG. 7(C) illustrates an example of a yet still further fluid running route in the device 10. In this example, a fluid running route for bring 2 fluids L1 and L2 into contact with each other to obtain a mixed fluid (L12), on the other hand, bring 2 fluids L3 and L4 into contact with each other to obtain a mixed fluid (L34) and then, bring these 2 mixed fluids into contact with each other to obtain a discharge fluid LP is set.

As described above, in the device according to the present invention, a fluid processor as a micro reactor that a fluid running route suitable for an intended micro reaction has been set according to the type of the intended micro reaction is formed, so that the intended micro reaction can be surely and usefully conducted by using this fluid processor.

Accordingly, although it is a device of a single construction, micro reactors suitable for micro reactions of different types are obtained by changing setting thereof, so that it is extremely convenient because it can be adapted for micro reactions of various types.

The device according to the present invention will be additionally described.

(1) Base material:

With respect to the base material, conditions such as its dimensions and shape can be freely determined. As an example thereof, may be mentioned a square base material having a length of 30 mm, a width of 30 mm and a thickness of 2 mm.

(2) Micro conduit:

The number of micro conduits and directions thereof are free to be decided. More specifically, it is not essential for the respective micro conduits to be linear and extend vertically and laterally. However, they are preferably linear and formed into a lattice extending vertically and laterally.

Each of the micro conduits may be any form so far as a liquid fluid such as water or an aqueous solution, or a gaseous fluid can be passed. When the fluid is liquid, the micro conduit is formed into, for example, a circular tunnel having an inner diameter of 30 μm. In this case, a flow rate is controlled to, for example, 0.5 μL/min.

When lateral micro conduits and vertical micro conduits are formed, it is not essential that the numbers thereof are 2, and the numbers may be 3 or more. It is also not essential that the number of lateral micro conduits and the number of vertical micro conduits are the same. Further, it is also not essential that a crossed axes angle between the lateral micro conduit and the vertical micro conduit is 90°. They may intersect at an acute angle or obtuse angle.

At an intersection where the micro conduits intersect at an acute angle, the respective fluids flowing into this intersection may come into contact with each other as they remain in a state of a laminar flow in some cases. In this case, these two fluids may not always be "mixed". However, a necessary processed result may be obtained by the fact that the two fluids come into "contact" with each other.

(3) Valve:

The construction of the valve may be any so far as it has a function of interrupting the passage of a fluid in the micro conduit in an operating state or non-operating state, and a specific construction thereof is not limited. For example, a valve ball having a charge and a valve control mechanism for driving this ball to move by an effect of an electric field may also be utilized.

In the valve in the embodiment in FIG. 2, an inner diameter of the spherical space 20 is, for example, 80 μm, and an outer diameter of the valve ball 28 is, for example, 40 μm. The valve chamber is not limited to the spherical space, and any other form may be allowed.

In the above-described embodiment, that composed of a magnetic field-sensitive substance is used as the valve ball, and a valve control mechanism utilizing a magnetizable film is adopted. According to this construction, the valve can be set to an opened state by demagnetizing a magnetized portion of the magnetizable film, so that setting conditions of a fluid running route formed once can be reset. As a result, the device 10 itself can be used repeatedly.

When the device 10 is used on a magnetizing apparatus, operating states, or opened and closed states of proper valves can be controlled while a micro reaction or the like is conducted in the device 10 that a fluid running route has been set once. As a result, the fluid running route can be freely changed.

When a certain fluid running route is intended to set in the above device, a plurality of combinations by making any valves an opened state and making the other valves a closed state may become possible in some cases. Further, a complicated specific fluid running route must be set in some cases.

Accordingly, in order to actually set a fluid running route in a fluid processor, it is convenient and practical to use a fluid running route setting apparatus utilizing a computer.

(4) Fluid to be processed:

A fluid to be processed in the above-described fluid processor is a liquid fluid or gaseous fluid, and its kind is not limited.

[Fluid Running Route Setting Apparatus]

In the fluid running route setting apparatus according to the present invention, is provided a conduit portion opening and closing mechanism having a function that individual valve control mechanisms related to all valves in a device as a target are driven, and is used a computer in which information as to the micro conduit network of the device and information as to positions of the valves have been stored. The conduit portion opening and closing mechanism is driven by a command for setting the fluid running route provided to the computer by a proper signal in such a manner that valves related to other conduit portions than conduit portions selected become a closed state, whereby a necessary fluid running route is set in the device.

[Fluid Processor]

The fluid processor by the device according to the present invention can also be used as a micro reactor for another process than such a chemical reaction as described above. For example, when 2 fluids, which have come to contact each other once, are separated to obtain a plurality of discharge fluids, a process that a substance contained in one fluid is transferred and extracted to the other fluid may be conducted.

In the device according to the present invention, may be provided a fluid suspending cavity formed of a space having a diameter greater than those of conduit portions related to an intersection of the micro conduits at the intersection. In the fluid suspending cavity, a fluid from a conduit portion related to the intersection is temporally suspended and retained, and the form thereof is not particularly limited. For example, it may be formed in a cylindrical or spherical space.

According to the fluid processor by the device according to the present invention, the relationship between inlet and outlet positions of a fluid in a specific fluid running route set is fixed, so that the fluid processor can be used as an apparatus having a function that should be called a fluid computer.

In other words, a plurality of fluid processors different in a part or the whole of the micro conduits making up the fluid running route are used to detect a position from which a fluid is discharged, whereby a position, into which the fluid has been fed to flow, can be known.

[Fluid Processor Unit]

The fluid processor of the present invention is fundamentally obtained by forming a fluid running route in a single device. However, a fluid processor may be constructed as a unit (or compound unit) by, for example, arranging a plurality of fluid processors by a single device in parallel along the same plane or stacking them on each other to connect them.

In such a fluid processor, a fluid discharged from one fluid processor of successive fluid processors making up it, is fed to a fluid processor subsequent thereto, so that a fluid to be processed can be successively processed.

In the fluid processor obtained by arranging a plurality of devices in a stacked form is preferable as an area required to arrange it may be lessened.

[Fluid Processor Having Stimulus Application Mechanism]

A proper stimulus application mechanism may be provided to the fluid processor according to the present invention. For example, a thermal stimulus application mechanism such as a heating means, or any other stimulus application mechanism may be provided in the whole of a part of the conduit portions making up the fluid running route as described below in detail. According to such a fluid processor, for example, an intended chemical reaction can be caused with high efficiency in actual use, so that the fluid processor is extremely useful as a micro reactor for a chemical reaction by a minute amount of fluid reagents.

Figure 8:
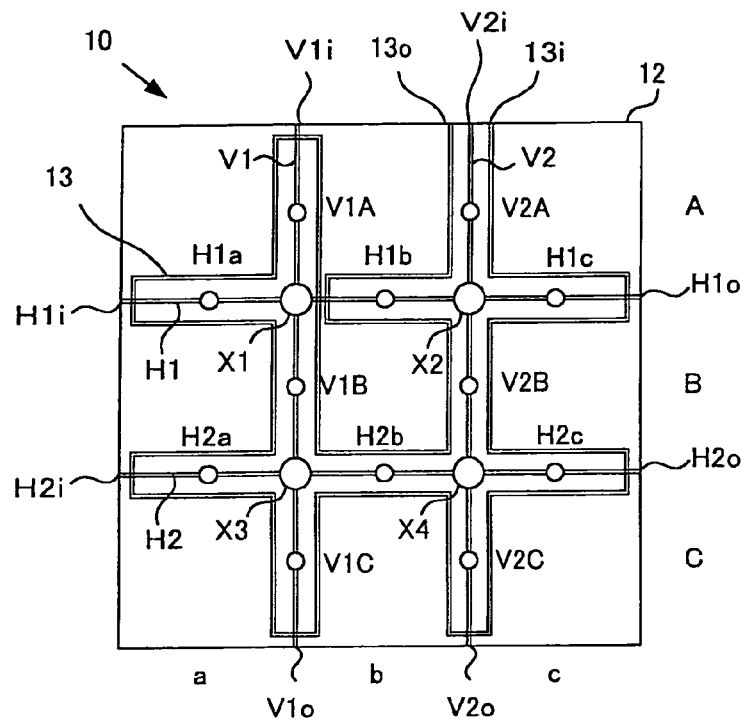
FIG. 8 typically illustrates an example of the construction of a device according to the present invention, which forms a fluid processor and is equipped with a thermal stimulus application mechanism.

FIG. 8 typically illustrates an example of the construction of a fluid processor according to the present invention, which is equipped with a thermal stimulus application mechanism.

In the embodiment in FIG. 8, the device 10 is so constructed that in a plate-shaped base material 12 in the form of a rectangle as a whole, 2 lateral micro conduits H1 and H2 in the form of a tunnel each extending in a horizontal direction in a plane direction thereof within the body part thereof and opened at the both ends thereof at both left and right side edges of the base material are formed in a state separated from each other in a vertical direction, 2 vertical micro conduits V1 and V2 in the form of a tunnel each extending in a vertical direction in the plane direction and opened at the both ends thereof at both top and bottom side edges of the base material are formed in a state separated from each other in a lateral direction, and the lateral micro conduits H1, H2 and vertical micro conduits V1, V2 intersect each other at 4 fluid suspending cavities X1, X2, X3 and X4 in total, whereby a micro conduit network is formed.

Figure 9:
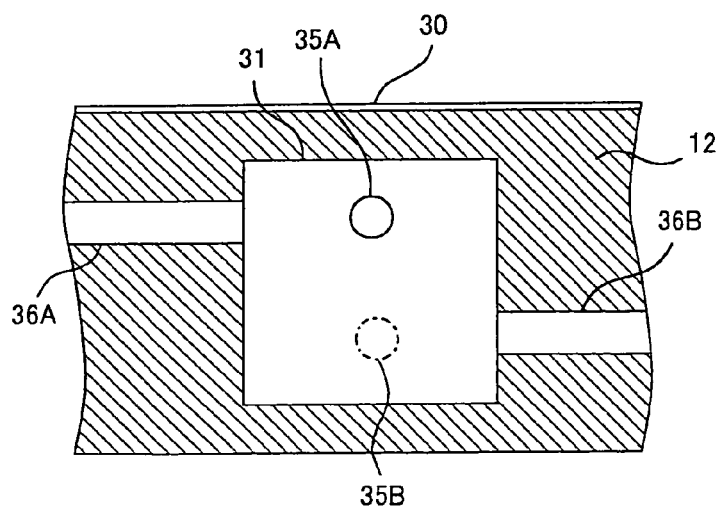
FIG. 9 is a cross sectional view illustrating the specific construction of a fluid suspending cavity at an intersection of a vertical micro conduit and a lateral micro conduit showing a section perpendicular to an extending direction of the vertical micro conduit.

FIG. 9 is a cross sectional view illustrating the specific construction of a fluid suspending cavity at an intersection of a vertical micro conduit and a lateral micro conduit showing a section perpendicular to an extending direction of the vertical micro conduit.

In the illustrated embodiment, the fluid suspending cavity 31 is formed by a space in the form of a cylinder extending in vertical direction as a whole in the body part of the base material 12. A vertical micro conduit 35A and a lateral micro conduit 36A are opened in the upper region of the fluid suspending cavity 31, and a vertical micro conduit 35B and a lateral micro conduit 36B are opened in the lower region thereof, whereby 4 conduit portions are continuously linked with one another to form a fluid running route.

In the fluid suspending cavity formed in the fluid running route, a fluid Fa to be processed flowed into the fluid suspending cavity from the micro conduit temporally suspended and retained and thereafter, flows out to a micro conduit extending from the fluid suspending cavity. When another fluid Fb is caused to flow into the fluid suspending cavity from another micro conduit, however, both fluids Fa and Fb to be processed are brought into contact with each other as flowing in the fluid suspending cavity.

As a result, both fluids are mixed and flow out as a mixed fluid to be processed of the fluids Fa and Fb to be processed. Since an effective contact effect or mixing effect or agitating effect is achieved by the fluid suspending cavity as described above, the 2 fluids to be processed can be sufficiently subjected to a contact process.

Further, in this device 10, a tunnel-like heat exchange medium circulating path 13 is formed in the body part of the base material 12 in the form independent of the micro conduit network by extending in parallel with each of the lateral micro conduits H1, H2 and vertical micro conduits V1, V2 and in close vicinity thereto, whereby the fluid processor is so constructed that the device 10 is equipped with a thermal stimulus application mechanism as a stimulus application mechanism for applying thermal stimulus to the fluids to be processed.

In this drawing, reference characters H1$i$, H2$i$, V1$i$ and V2$i$ denote openings located at left side edge and upper side edge of the base material 12, H1$o$, H2$o$, V1$o$ and V2$o$ denote openings located at right side edge and lower side edge of the base material 12, and 13$i$ and 13$o$ are an opening for feed and an opening for discharge of the heat exchange medium circulating path 13 located at the upper side edge of the base material 12.

Specifically, as illustrated, the heat exchange medium circulating path 13 is formed by 2 conduit forming portions related to the heat exchange medium circulating path 13, independent as a whole, as one circulating path which extends in close vicinity to both sides of each of the conduit portions of the micro conduits V1, V2, H1 and H2, and also in close vicinity to the respective fluid suspending cavities X1 to X4 and has the opening 13i for supply and the opening 13o for discharge.

The heat exchange medium circulating path 13 forms a thermal stimulus application mechanism that is a stimulus application mechanism for applying thermal stimulus such as heating or cooling to fluids to be processed in the micro conduit network by feeding a heat exchange medium from the opening 13i for feed by a heat exchange medium feeding mechanism not illustrated.

In this embodiment, the heat exchange medium circulating path 13 may be any form so far as a proper heat exchange medium can be circulated. For example, it is in the form of a circular tunnel having an inner diameter of 10 to 3000 μm.

No particular limitation is imposed on the heat exchange medium fed to the heat exchange medium circulating path 13 so far as it acts as a cooling medium which cools the base material 12 or a heating medium which heats the base material 12 by heat conduction according to a thermal gradient present between the heat exchange medium and the base material 12, and various media can be used.

As specific examples of the heat exchange medium, may be mentioned water, steam, superheated steam, alcohols such as methanol and polyethylene glycol, aromatic hydrocarbons such as alkylnaphthalenes and alkylbenzenes, alicyclic hydrocarbons, saturated aliphatic hydrocarbons and unsaturated aliphatic hydrocarbons such as ethane, ethylene, propane and propylene, molten salts, fluorinated hydrocarbons, fluorinated halogenated hydrocarbons, ammonia, nitrogen, and air. These media may be used either singly or in any combination thereof.

No particular limitation is imposed on a material forming the base material 12. It is preferably suitably selected according to the kinds of fluids circulating in the micro conduits, the kind of the stimulus application mechanism installed, reaction conditions set by the stimulus application mechanism, and the like. Specifically, for example, glass, a resin or a metal may be preferably used. However, the resin is particularly preferably used from the viewpoint of easy production.

As the material of the base material 12, that having transparency, for example, glass, a transparent resin or the like, may preferably be used, whereby the fluid suspending cavities or the like may be observed visually.

When the base material 12 is formed by a resin, the so-called stereo lithography may preferably be used from the viewpoint of easy processing and molding.

The inner wall surfaces of the micro conduits may be coated with, for example, a fluororesin.

With respect to the base material 12 in the device 10, conditions such as dimensions and shape can be freely determined. As an example thereof, may be mentioned a square base material having a length of 30 mm, a width of 30 mm and a thickness of 5 mm.

Each of the micro conduits may be any form so far as an intended fluid can be passed, and the micro conduit is formed into, for example, a circular tunnel having an inner diameter of 30 μm. In this case, a flow rate is controlled to, for example, 0.5 μL/min.

The fluid suspending cavity 31 may be formed into that having a volume of 0.0008 to 20 μl, for example, that in the form of a cylinder having a height of 100 to 3000 μm, particularly preferably 200 to 2000 μm and a diameter of 100 to 3000 μm, particularly preferably 200 to 2000 μm may be preferably used. However, no particular limitation is imposed on the form of the fluid suspending cavity, and it may be formed into size and shape according to an intended reaction and may be in the form of, for example, a sphere or rectangle.

In the fluid processor formed of the device 10 of the construction shown in FIG. 8, a fluid running route is formed by controlling the operating states of proper valves. Fluids to be processed are fed to the fluid running route from proper openings by a fluid feeding mechanism formed of, for example, micropump not illustrated, and a heat exchange medium is fed to the heat exchange circulating path 13 from the opening 13i for feed by a heat exchange medium feeding mechanism formed of, for example, a micropump, whereby a desired micro fluid process is conducted.

In this fluid processor, the base material 12 is first controlled to an expected temperature by heat conduction according to a thermal gradient present between the heat exchange medium and the base material 12. A thermal gradient is thereby formed between the base material 12 and fluids to be processed, and proper thermal stimulus is indirectly applied to the fluids to be processed by heat conduction caused as the result thereof. Here, in the thermal stimulus application mechanism utilizing the heat exchange medium in such a mode, the heat conduction from the heat exchange medium to the fluids to be processed is indirect. It is therefore preferable to control the temperature of the heat exchange medium taking conduction loss involved in the heat conduction into consideration.

Figure 10:
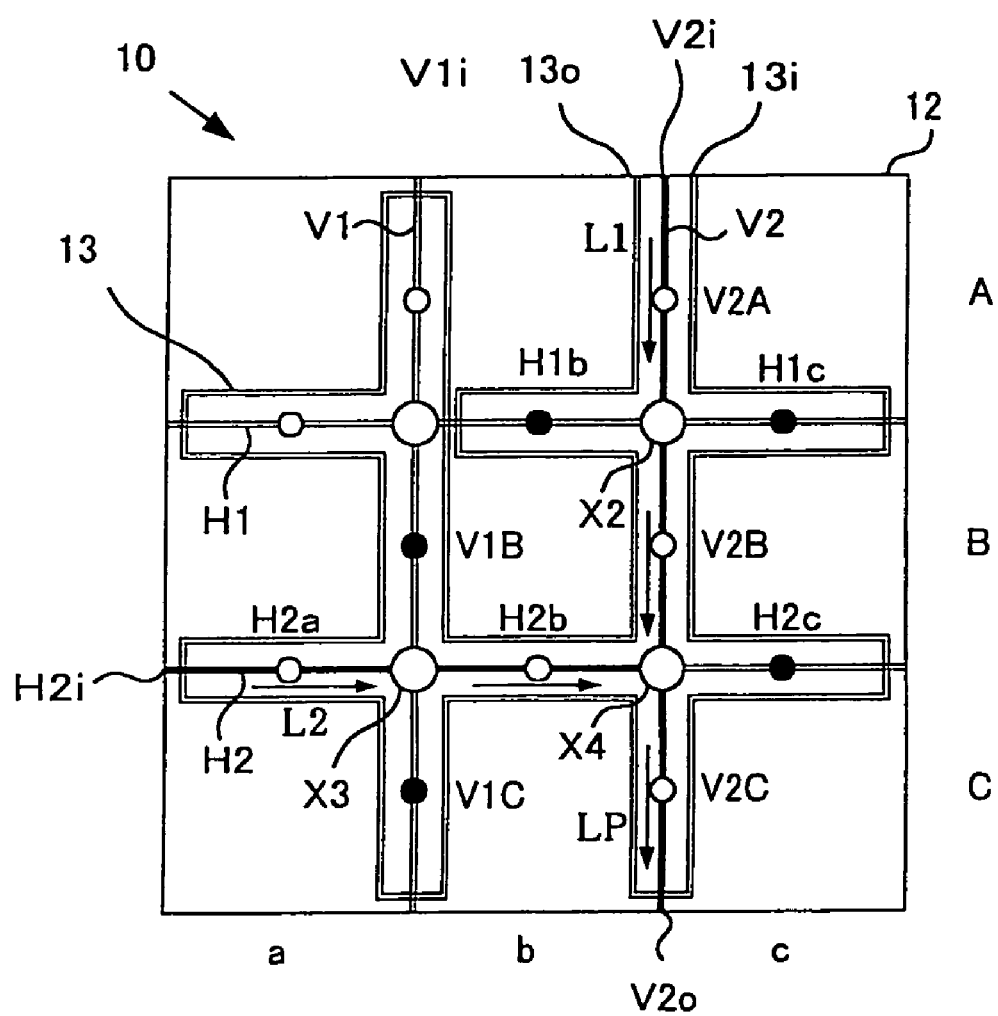
FIG. 10 illustrates a fluid processor that a fluid running route has been formed in the device shown in FIG. 8.

Specifically, the heat exchange medium is fed to the heat exchange medium circulating path 13 to set the temperature state of the base material 12. As illustrated in, for example, FIG. 10, the valves H1b, H1c, H2c, V1B and V1C are set to a closed state in the device 10 shown in FIG. 8, and other valves than these valves are set to an opened state, whereby a state that passage of the fluids to be processed becomes feasible is formed in the whole of the micro conduit V2, the conduit portion H2a and the conduit portion H2b.

In this state, when fluids L1 and L2 that are fluids to be processed are fed to flow into the conduit portions V2A and H2a from the openings V2i and H2i in the outer peripheral edge of the base material 12, respectively, the fluids L1 and L2 controlled to a proper temperature state by applying thermal stimulus through the base material 12 join and come into contact with each other at the fluid suspending cavity X4, flow through the conduit portion V2C in a mixed state and are discharged as a discharge fluid LP from the opening V2o in the outer periphery of the base material 12.

In the above, when liquid reaction reagents R1 and R2 are used as the fluids L1 and L2, the discharge fluid LP comes to contain a reaction product P(12) according to the following reaction formula (3):

R1+R2→P(12)     Reaction formula (3)

Here, the liquid reaction reagents R1 and R2 are mixed in a state the temperatures thereof have been set to an expected temperature state, so that the reaction according to the reaction formula (3) that is an intended process comes to be conducted at high efficiency.

In the above, no particular limitation is imposed on the stimulus application mechanism so far as it can apply various stimuli to the fluids to be processed. For example, a radiative stimulus application mechanism that stimulus is applied to the fluids to be processed utilizing various radiation rays may preferably be used.

Such a stimulus application mechanism may be either a mechanism that directly acts on the fluids to be processed passing in the micro conduits, thereby directly applying stimulus to the fluids to be processed, or a mechanism that first acts on the base material to activate the base material itself, and stimulus is applied to the fluids to be processed through the activated base material, in other words, stimulus is indirectly applied to the fluids to be processed through the medium of the base material.

The fluid processor according to the present invention may have the construction that at least two stimulus application mechanisms are provided in, for example, one device. In this case, said at least two stimulus application mechanisms are preferably at least one of the thermal stimulus application mechanism and radiative stimulus application mechanism.

The fluid processor according to the present invention may also have the construction that at least one of stimulus application mechanisms for applying at least one of, for example, thermal stimulus and radiative stimulus is provided in common in a plurality of devices independent of each other or a plurality of devices connected to each other into a compound unit.

According to the fluid processor having the construction that at least two stimulus application mechanisms are provided in one device, a fluid process, by which stimuli of, for example, different kinds by each of the stimulus application mechanisms are applied to fluids to be processed at the same time, can be conducted.

In the above, as specific examples of the stimulus application mechanisms, may be mentioned temperature control mechanisms formed of a radiating-endothermic sheet utilizing, for example, a Peltier effect element, heating mechanisms by a resistance heater formed of a transparent conductive film, infrared irradiation mechanisms, electromagnetic wave irradiation mechanisms, ultraviolet light irradiation mechanisms and laser irradiation mechanisms.

When a temperature control mechanism formed of a radiating endothermic sheet utilizing a Peltier effect element is used as the stimulus application mechanism, it is only necessary to arrange such a sheet on the whole of a surface or both surfaces of the base material in the device, regions in close vicinity to proper conduit portions and fluid suspending cavities, or the like.

When a radiative stimulus application mechanism is used as the stimulus application mechanism, it is only necessary that fluids to be processed have radiation-absorbing ability, and the whole or a part of the base material in the device is formed with a material having permeability to radiation. However, a device, the whole base material of which is formed with the material having permeability to radiation, is preferably used in that the production is easy, and high general-purpose property can be realized in the resulting device. When the device, the whole base material of which has permeability to radiation, is used, a mask having a specific pattern is arranged on the surface thereof as needed, whereby regions, in which radiative stimulus is applied to fluids to be processed, can be suitably selected.

According to the embodiment described above, stimulus by the radiation is directly applied to the fluids to be processed with high efficiency.

Here, when the radiative stimulus application mechanism is utilized as the stimulus application mechanism, a device, the whole or a part of the base material of which is formed with a material having radiation-absorbing ability, may also be used as the device.

In this case, the stimulus by the radiation is so-called indirectly applied to the fluids to be processed through the medium of the base material, so that the fluids to be processed are not required to have the radiation-absorbing ability.

Figure 11:
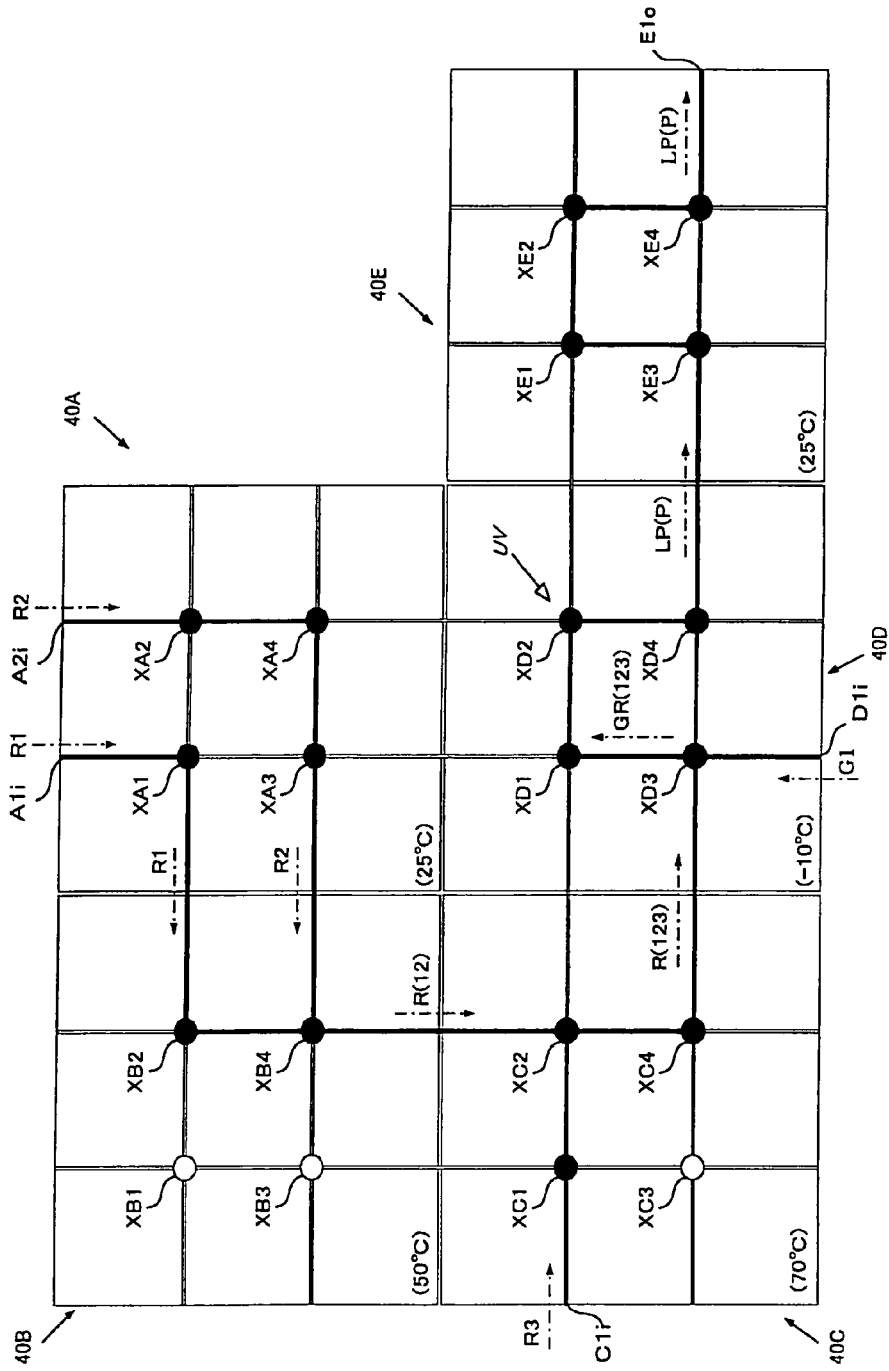
FIG. 11 illustrates a fluid processor that a fluid running route has been formed by a plurality of devices, and at the same time a stimulus application mechanism has been equipped.

FIG. 11 illustrates a fluid processor that a fluid running route has been formed by a plurality of devices, and a stimulus application mechanism has been provided.

This fluid processor is constructed as the so-called fluid processor compound unit by arranging 5 fluid processors 40A, 40B, 40C, 40D and 40E respectively formed by devices, in which respective specific fluid running routes have been formed by suitably controlling the operating states of valves related to conduit portions of respective micro conduits, in parallel along the same plane. Specifically, the fluid processor 40B adjoins a side (left side in FIG. 11) of the fluid processor 40A, the fluid processor 40C adjoins a lower side of the fluid processor 40B, the fluid processor 40D adjoins a right side of the fluid processor 40C, and further the fluid processor 40E adjoins a right side of the fluid processor 40D, whereby the fluid processors 40D, 40C are arranged so as to adjoin lower sides of the fluid processors 40A, 40B, respectively.

Here, the fluid processors 40A, 40B, 40C and 40E have the same construction as the device, which has been equipped with the thermal stimulus application mechanism, of the construction shown in, for example, FIG. 8, and the temperature states thereof are controlled to, for example, 25° C., 50° C., 70° C. and 25° C., respectively, by the respective thermal stimulus application mechanisms. However, heat exchange medium circulating paths 13 are not illustrated.

The fluid processor 40D has the construction that an ultraviolet irradiation mechanism has been additionally provided in the device, which has been equipped with the thermal stimulus application mechanism, of the construction shown in, for example, FIG. 8. The temperature state thereof is controlled to −10° C., and a fluid suspending cavity XD2 is irradiated with ultraviolet light having a specific wavelength.

Here, the device making up the fluid processor 40D is constructed by a base material, in which a region related to the fluid suspending cavity XD2 has been formed with a material having permeability to ultraviolet light, and an intermediate mixture RG(123), which passes through the fluid suspending cavity XD2 and will be described subsequently, is a fluids to be processed having ultraviolet light-absorbing ability.

In the embodiment shown in FIG. 11, for example, the following process is conducted.

More specifically, a liquid reaction reagent R1 that is a first fluids to be processed is fed from an opening A1*i* of the fluid processor 40A and flows through 2 conduit portions including a fluid suspending cavity XA1, whereby the temperature state thereof is controlled to 25° C. Thereafter, the reagent flows through a fluid suspending cavity XB2 and 2 conduit portions in the fluid processor 40B, thereby controlling the temperature thereof to 50° C. In this state, the reagent flows into a fluid suspending cavity XB4.

A second liquid reaction reagent R2 is fed from an opening A2*i* of the fluid processor 40A and flows through 4 conduit portions including a fluid suspending cavity XA2, fluid suspending cavity XA4 and fluid suspending cavity XA3, whereby the temperature state thereof is controlled to 25° C.

Thereafter, the reagent flows through a conduit portion in the fluid processor 40B, thereby controlling the temperature thereof to 50° C. In this state, the reagent flows into a fluid suspending cavity XB4.

The reaction reagents R1 and R2 are thereby mixed under reaction conditions of 50° C. in the fluid suspending cavity XB4. As a result, a specific reaction by both reagents takes place to form a primary intermediate product R(12).

The primary intermediate product R(12) flows through a conduit portion in the fluid processor 40c from the fluid suspending cavity XB4, thereby controlling the temperature thereof to 70° C. In this state, the primary intermediate product flows into a fluid suspending cavity XC2.

On the other hand, a liquid reaction reagent R3 that is a third fluids to be processed is fed from an opening Cli of the fluid processor 40C and flows through 2 conduit portions including a fluid suspending cavity XC1, whereby the temperature thereof is controlled to 70° C. In this state, the reagent flows into a fluid suspending cavity XC2.

The primary intermediate product R(12) and the reaction reagent R3 are thereby mixed under reaction conditions of 70° C. in the fluid suspending cavity XC2. As a result, a specific reaction by both product and reagent takes place to form a secondary intermediate product R(123).

After the secondary intermediate product R(123) then flows through 2 conduit portions including a fluid suspending cavity XC4 from the fluid suspending cavity XC2, it flows through a conduit portion in the fluid processor 40D, thereby controlling the temperature thereof to −10° C. In this state, it flows into a fluid suspending cavity XD3.

A gaseous reaction reagent G1 that is a fourth fluids to be processed is fed from an opening D1i of the fluid processor 40D and flows through a conduit portion, whereby the temperature thereof is controlled to −10° C. In this state, the reagent flows into a fluid suspending cavity XD3.

The secondary intermediate product R(123) and the reaction reagent G1 are thereby mixed under reaction conditions of −10° C. in the fluid suspending cavity XD3 to formulate an intermediate mixture RG(123).

The intermediate mixture RG(123) flows through 2 conduit portions including fluid suspending cavity XD1 and flows into a fluid suspending cavity XD2 in a state that the temperature thereof has been controlled to −10° C. In this fluid suspending cavity XD2, stimulus by ultraviolet light having a proper wavelength is applied to the intermediate mixture RG(123), whereby a specific photochemical reaction by the secondary intermediate R(123) formulating the intermediate mixture RG(123) and the reaction reagent G1 is excited. As a result, a final product P is formed in a state being contained in a discharge fluid LP.

From the fluid suspending cavity XD2, the discharge fluid LP containing the final product P flows through 2 conduit portions including a fluid suspending cavity XD4 in the fluid processor 40D and 5 conduit portions including a fluid suspending cavity XE3, fluid suspending cavity XE1, fluid suspending cavity XE2 and fluid suspending cavity XE4 in the fluid processor 40E, whereby it is discharged from an opening E1o in the state that the temperature thereof has been controlled to 25° C. to obtain the final product P.

According to the fluid processor described above, it is constructed by equipping it with the devices for fluid processor and providing the stimulus application mechanism in the device for fluid processor, so that various stimuli can be applied to fluids to be processed in an expected mode according to an intended fluid process. Therefore, in a chemical reaction or the like involved in such fluid process, high efficiency as to, for example, yield of a reaction product and/or a rate of the reaction can be achieved. In addition, setting of process conditions can be achieved by the stimulus application mechanism. As a result, a variety of novel micro fluid process can be conducted.

Although fluid processors having the stimulus application mechanism have been described above on the basis of the specific modes, the present invention is not limited to the above-described embodiments, and various modifications may be added.

No particular limitation is imposed on the fluid process utilizing the fluid processor. As specific examples thereof, may be mentioned various chemical reactions, mixing process of a plurality of fluids and cell reactions using cells or the like.

When an individual thermal stimulus application mechanism is provided in each device in the fluid processor obtained by connecting a plurality of devices, the fluid processors are preferably arranged through a heat insulating layer utilizing, for example, air between adjoining fluid processors. In such a fluid processor, a thermal influence by another fluid processor arranged adjoiningly is controlled to be reduced.

When lateral micro conduits and vertical micro conduits are formed in the base material making up the device for fluid processor, it is not essential that the numbers thereof are 2, and the numbers may be 3 or more.

It is also not essential that the number of lateral micro conduits and the number of vertical micro conduits are the same. Further, it is also not essential that a crossed axes angle between the lateral micro conduit and the vertical micro conduit is 90°. They may be continuously linked with the microspace portion at an acute angle or obtuse angle.

In the fluid processor, a film-like supporting part, which supports various substances to be processed or the like, but allows permeation of fluids, may be arranged within the fluid suspending cavity 31 so as to extend in the plane direction and dividing the internal space of the fluid suspending cavity 31 into an upper space and a lower space. The fluid processor may be so constructed that each 2 micro conduits are opened to the upper space and the lower space.

When the fluid suspending cavity 31 is equipped with the film-like supporting part, a part (not illustrated) for preventing outflow of a substance to be processed composed of, for example, any of various mesh parts may also be provided on each of openings related to the micro conduits opened to the fluid suspending cavity 31 as needed. This can allow flowing of a fluid and prevent a substance to be processed located within the fluid suspending cavity 31 from flowing out.

According to such a device that the fluid suspending cavity has been formed at an intersection of the micro conduits, for example, a device for bioassay can be obtained by immobilizing a living body such as a cell to be cultured in the space of the fluid suspending cavity and setting a fluid running route including micro conduits related to the intersection.

[Fluid Processing Method]

Figure 12:
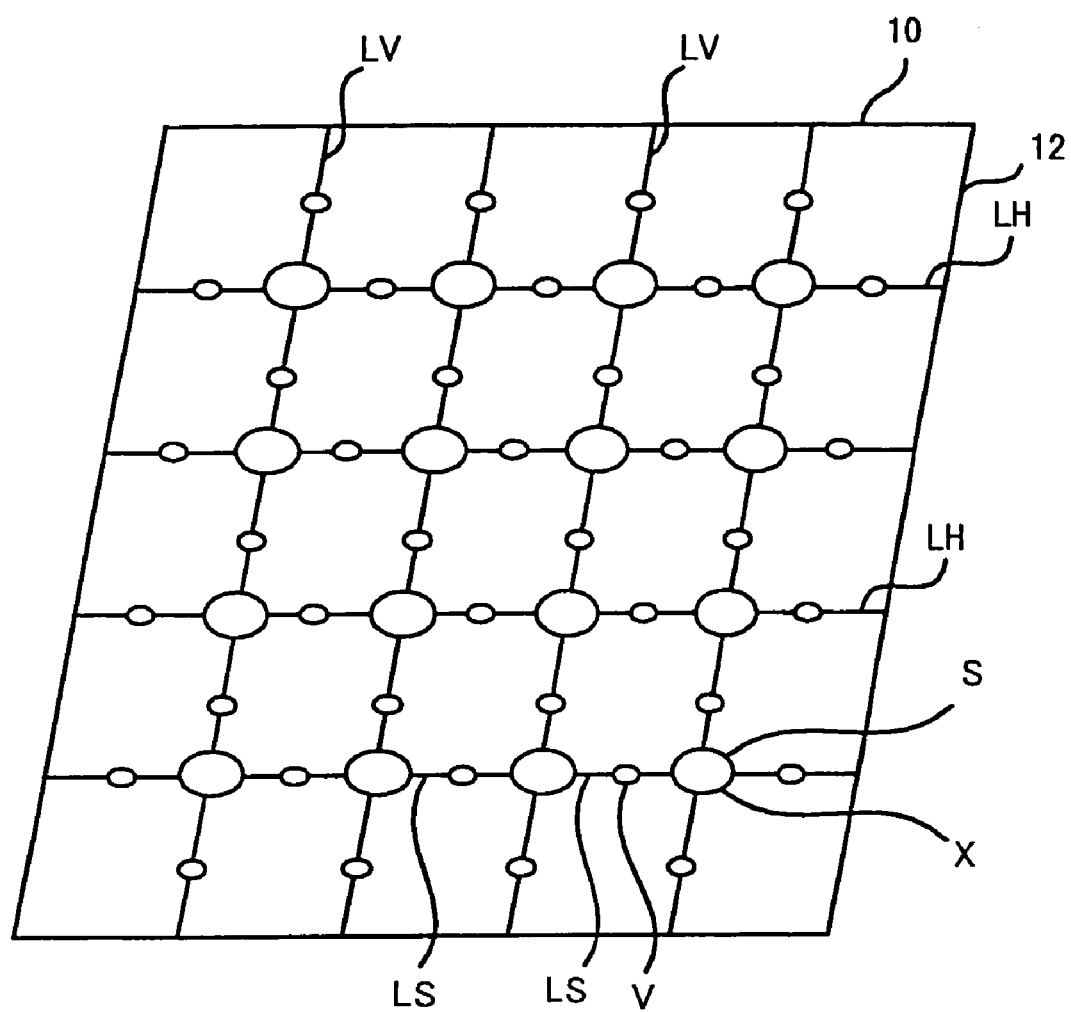
FIG. 12 is a perspective view typically illustrating an example of the basic construction of a device used in construction of a fluid processor in the present invention.

FIG. 12 is a perspective view typically illustrating an example of the basic construction of a device 10 for fluid processor used in construction of a fluid processor in the fluid processing method according to the present invention.

In the embodiment in FIG. 12, a plurality of micro conduits (drawn by a solid line) are formed in a state intersecting with one another in a base material 12 so as to each extend in a plane direction in the form of a circular tunnel in section within the body part of the base material 12, and a micro conduit network is formed by these micro conduits.

Specifically, a plurality (4 paths in the embodiment illustrated) of lateral micro conduits LH each extending in a lateral direction of the base material 12 and opened at the both ends thereof at both left and right side edges of the base material are formed in a state separated from one another in a vertical direction along lines (lines equally dividing into 5 pieces in the embodiment illustrated) vertically equally dividing a square of the base material 12, and a plurality (4 paths in the embodiment illustrated) of vertical micro conduits LV each extending in a vertical direction of the base material 12 and opened at the both ends thereof at both top and bottom side edges of the base material are formed in a state separated from one another in a lateral direction along lines (lines equally dividing into 5 pieces in the embodiment illustrated) laterally equally dividing the square of the base material 12.

Accordingly, the lateral micro conduits LH and vertical micro conduits LV intersect one another, and 16 intersections X in total are formed in this embodiment. Each of the lateral micro conduits LH and vertical micro conduits LV is divided by 4 intersections X on said micro conduit, thereby forming 5 conduit portions LS. In one lateral micro conduit LH or vertical micro conduit LV, the 5 conduit portions LS formed by being divided by 4 intersections X, each have the same length.

At each of the intersections X of the lateral micro conduits LH and vertical micro conduits LV in the base material 12, a space portion having a diameter greater than the diameter of the micro conduits is formed, thereby providing a fluid suspending cavity S, and a valve V for opening or closing the conduit portion is provided in each of the conduit portions LS.

Figure 13:
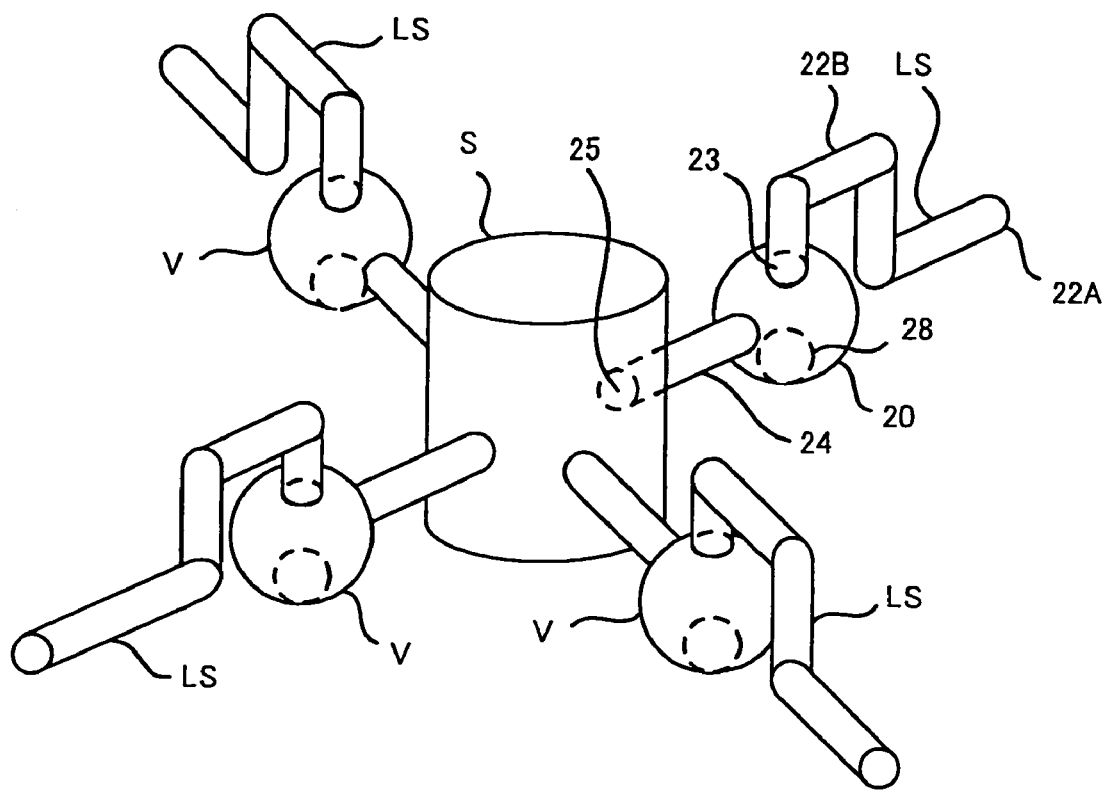
FIG. 13 is a perspective view illustrating the relationship among a fluid suspending cavity, 4 conduit portions related to the fluid suspending cavity and valves in each of the conduit portions as an image.
Figure 14:
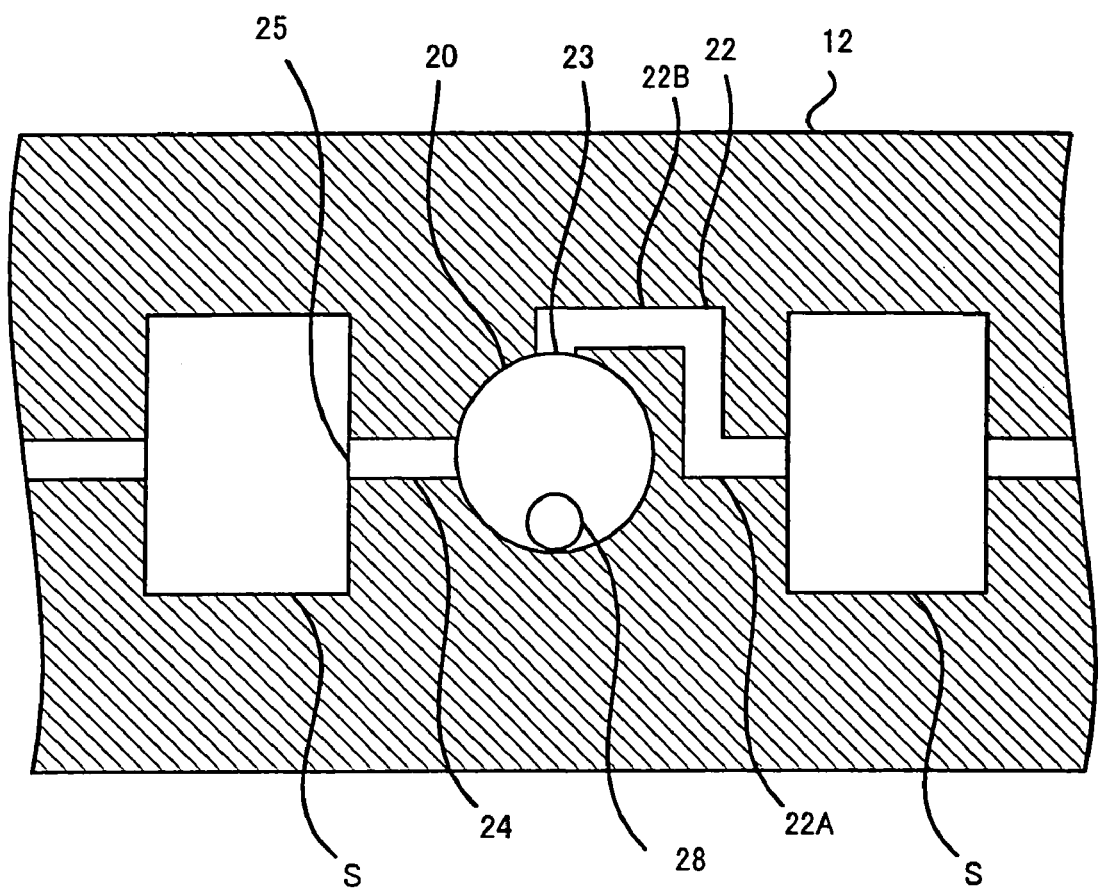
FIG. 14 is a cross sectional view illustrating a valve in a conduit portion and fluid suspending cavities at both ends of the conduit portion.

FIG. 13 is a perspective view illustrating the relationship among a fluid suspending cavity S, 4 conduit portions LS related to the fluid suspending cavity S and valves V in the respective conduit portions LS as an image, and FIG. 14 is a cross sectional view illustrating a valve V in a conduit portion LS and fluid suspending cavities S at both ends of the conduit portion LS.

As illustrated in these drawings, the fluid suspending cavity S is formed by a cylindrical space extending in a thickness-wise direction of the base material 12, and 4 conduit portions LS each formed of a hole in the form of a circle in section are continuously linked at a central level in an axial direction of the fluid suspending cavity S by being opened to a peripheral wall of the fluid suspending cavity S with an angle of 90° in a circumferential direction.

The valve V is formed by a valve chamber 20 formed of a spherical space formed in a state intervening in the way of the conduit portion LS formed in the body part of the base material 12 and having an inner diameter greater than that of said conduit portion LS, and a valve ball 28 arranged in the valve chamber 20 and making up a valve particle which will become a valve disk of the valve.

To the valve chamber 20, are opened 2 pores 22 and 24 forming a conduit portion LS. One pore 22 has a main portion 22A extending along the surface of the base material 12 and a U-shaped curved portion 22B connecting to the main portion 22A, and the curved portion 22B continuously linked with the valve chamber 20 through a circular opening 23 at the upper portion of the valve chamber 20. A peripheral edge of the opening 23 acts as a valve seat. The other pore 24 extends along the surface of the base material 12 and continuously linked with a side portion of the valve chamber 20 at an opening 25. The conduit portion LS is formed by the valve chamber 20, and one pore 22 and the other pore 24 which are in a state continuously linked with each other by being opened to the valve chamber.

In the above, the 2 pores 22 and 24 have the same diameter, and the valve ball 28 has an outer diameter greater than the diameter of the pores 22 and 24. This valve ball 28 is composed of a magnetic field-sensitive substance, for example, a ferromagnetic substance such as iron, nickel or cobalt. A magnetizable film (not illustrated) for driving the valve ball 28 to move in a thickness-wise direction (top and bottom direction in the figure) of the base material 12 is provided on the surface of the base material 12.

In the actual device, the shape in an example of the base material is such that the length is 50 mm, the width is 50 mm, and the thickness is 3 mm, the diameter of the micro conduit is 10 μm to 3 mm, and a flow rate in a micro conduit is, for example, 0.0001 to 5 mL/min. These numerical values are by way of example, and the present invention is not limited thereto.

In such a device 10, suitable conduit portions successively connected are selected from among 40 conduit portions LS in total, and valves V in other conduit portions LS than those selected here are set to a closed state, whereby a continuous running route having a fluid inlet and a fluid outlet respectively opened to a peripheral edge of the base material 12 can be set by the conduit portions LS thus selected, thereby forming a fluid processor that a running route for fluid process has been set. Incidentally, in some cases, it is not always necessary to set all valves in other conduit portions LS than those selected a closed state, since it is only necessary to form a finalized running route for fluid process by the selected conduit portions LS.

In such a fluid processor, when a fluid to be processed is fed from the fluid inlet by a micropump, the fluid to be processed flows through the conduit portions LS forming the running route for fluid process, including the valve chambers 20 of the valves V and fluid suspending cavities S, and is discharged from the fluid outlet, so that suitable process can be conducted on the fluid to be processed during this passage.

As examples of the process for the fluid to be processed, may be mentioned mixing process mixing 2 or more fluids to be processed, reaction process chemically or biologically reacting 2 or more fluids to be processed with each other, thermal process heating or cooling a fluid to be processed, and radiation irradiating process irradiating a fluid to be processed with radiation such as light from the outside. A plurality of processes may be conducted in combination in some cases. For example, a mixing process or reaction process may be conducted in some cases accompanied by a thermal process, radiation irradiating process or the like.

In the fluid processor, some conditions may be required in some cases according to a process actually conducted. For example, when a mixing process or reaction process is conducted, the running route for fluid process may be required to have 2 or more fluid inlets for feeding a plurality of fluids to be processed in some cases. When a thermal process or radiation irradiating process is conducted, it is necessary to provide mechanism for such a process. Even in the device, conditions suitable for such a process are required. For example, when a radiation irradiating process is conducted, the device is required to be formed of a base material with a material transparent to such radiation.

In the present invention, when a length suitable for conducting an intended process as to a fluid to be processed, or objective process time of a prescribed length is present, in other words, a process should be conducted for only objective processing time, the running route for fluid process is set in such a manner that passing time becomes a length meeting with this objective processing time in the case where such a fluid processor as described above is constructed.

Specifically, the passing time (i.e., time required for a fluid to be processed fed to reach the fluid outlet from a starting point of the process) T1 of the fluid to be processed determined by the flowing rate of the fluid to be processed and the length of the running route for fluid process is found, and the running route for fluid process is set in the device 10 in such a manner that this passing time T1 matches to become the same as the objective processing time T, or a difference between the passing time T1 and the objective processing time T becomes the smallest, and so they are substantially same with each other.

In the fluid processor that the running route for fluid process has been set in such a manner, when for example, a liquid fluid to be processed is fed from a fluid inlet related to the running route for fluid process by, for example, a micropump, the fluid to be processed fed is passed through the running route for fluid process and discharged from the fluid outlet. At this time, the time the fluid to be processed is actually processed is the passing time T1 of the fluid to be processed. Since this passing time T1 is same or substantially same as the objective processing time T, the time, which the fluid to be processed discharged from the fluid outlet has been subjected to the process during the passage comes to be same or substantially same as the objective processing time T. After all, a result that the expected process as to a minute amount of the fluid to be processed has been surely conducted can be obtained.

Figure 15:
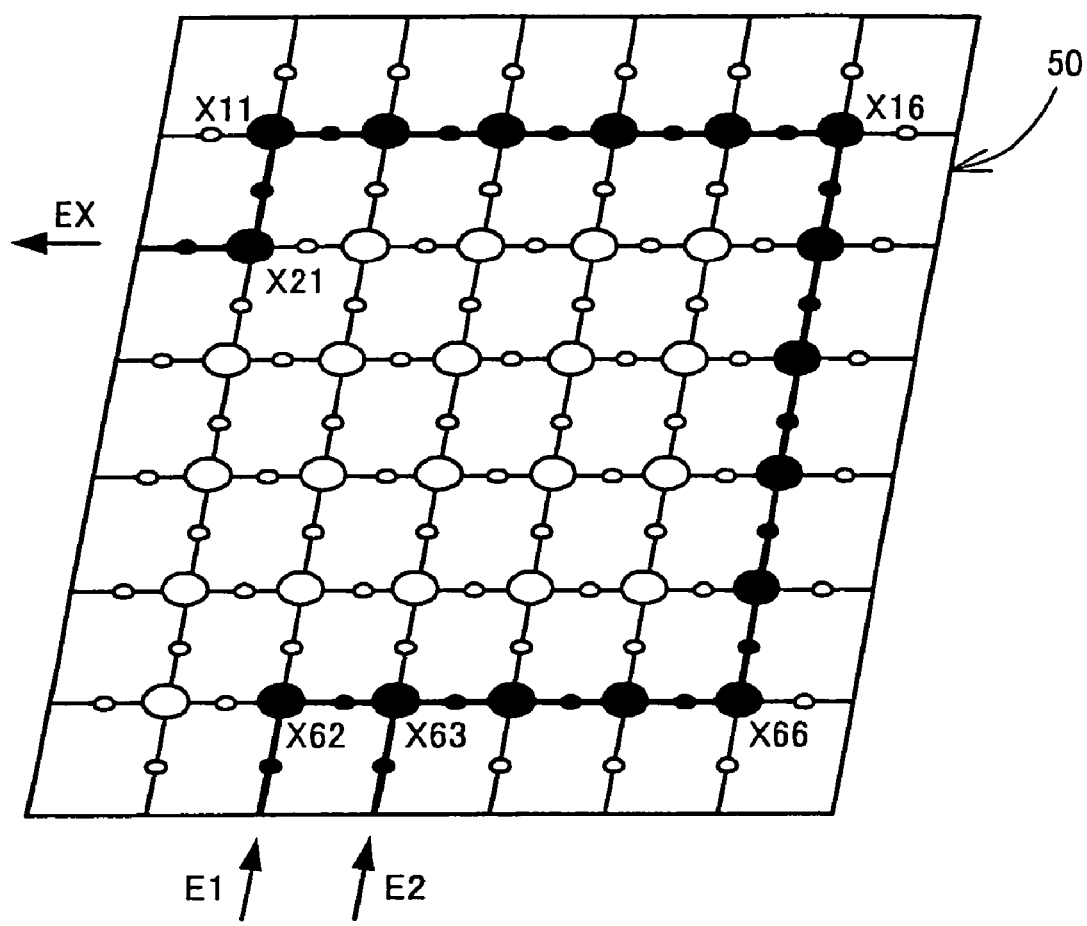
FIG. 15 is a perspective view typically illustrating the construction of a fluid processor for specifically explaining a fluid processing method according to the present invention by the fluid processor.

FIG. 15 is a perspective view typically illustrating the construction of a fluid processor 50 for specifically explaining a fluid processing method according to the present invention by the fluid processor. In the device related to this fluid processor 50, each 6 of lateral micro conduits LH and vertical micro conduits LV are formed. However, the other construction is the same as the device 10 shown in FIG. 12.

In the fluid processor 50 in FIG. 15, with respect to 36 intersections in total of the lateral micro conduits LH and vertical micro conduits LV, an intersection of the m-th lateral micro conduit from the top and the n-th vertical micro conduit from the left is denoted by indicating numerals of m and n following a letter X.

For example, an intersection of the first lateral micro conduit LH from the top and the sixth vertical micro conduit from the left is described as "intersection X16".

In the fluid processor 50 in FIG. 15, as indicated by conduit portions by a bold line, and valves V and fluid suspending cavities S black painted, a running route for fluid process is set by setting valves V in all of conduit portions present on a line from an intersection X62 to an intersection X66, from an intersection X66 to an intersection X16, from an intersection X16 to an intersection X11 and from an intersection X11 to an intersection X21, and conduit portions directly continuously linked with an intersection X62, an intersection X63 and an intersection X21 from a peripheral edge of a base material an opened state, and setting other valves than these a closed state.

Openings of the conduit portions in the peripheral edge of the base material directly linked with the intersection X62 and intersection X63 are used as fluid inlets E1 and E2 for fluids to be processed, respectively, and an opening in the peripheral edge of the base material of the conduit portion directly linked with the intersection X21 is used as fluid outlets EX.

This fluid processor is adapted to mix and react first and second fluids to be processed by respectively feeding the both fluids to be processed from 2 fluid inlets. The starting point of the process is a fluid suspending cavity related to the intersection X63 where mixing of both fluids to be processed is conducted, and an effective running route, during which the process is actually conducted, is between the intersection X63 and the fluid outlet EX. Here, supposing that a conduit from an inlet of a pore 22 making up a conduit portion LS to an outlet of a fluid suspending cavities connecting through a valve V is "unit conduit", the effective running route comes to be formed by 15 unit conduits in total.

Figure 16:
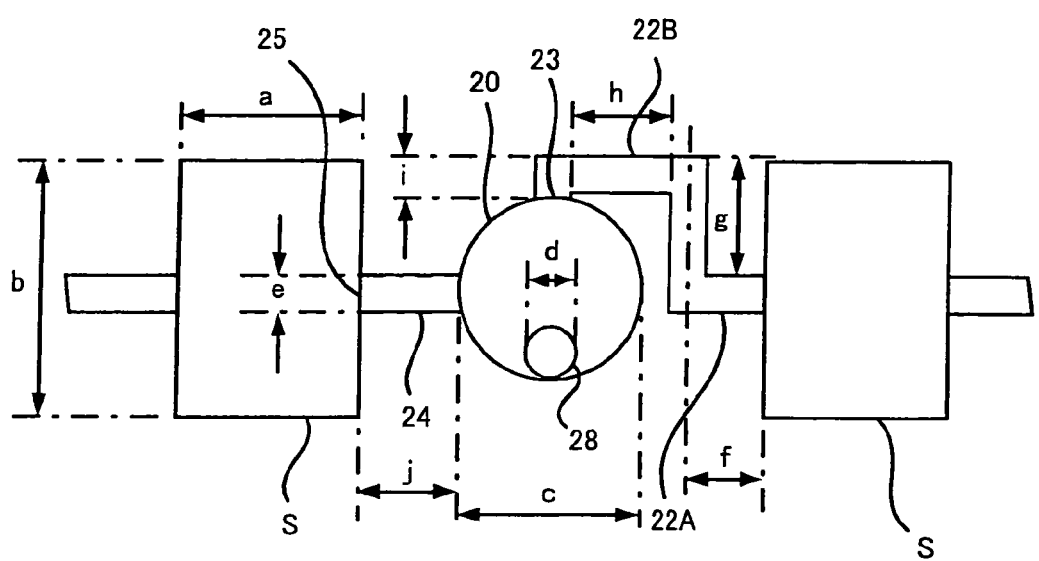
FIG. 16 illustrates dimensions of the respective parts or portions in the device shown in FIG. 14.

FIG. 16 illustrates dimensions of the respective parts or portions in the device 50 of this fluid processor. More specifically, the diameter a of the cylindrical fluid suspending cavity S is 2 mm, the height b is 3 mm, the diameter c of the valve chamber 20 of the valve V is 2 mm, the diameter d of the valve ball 28 is 0.5 mm, the inner diameter e of the pores 22, 24 forming the conduit portion LS is 0.4 mm, the length f of the main portion 22A in the pore 22 extending from an adjoining fluid suspending cavity S to said fluid suspending cavity S is 1 mm, the length g of the first portion of the curved portion 22B connecting to the main portion 22A extending in the thickness-wise direction is 1.6 mm, the length h of the second portion extending in the plane direction is 1 mm, the length i of the third portion extending to the opening 23 in the thickness-wise direction is 0.6 mm (length of a center axis of the pore 22: 3 mm in total), the length j of the pore 24 is 1 mm.

From these numerical values, the volume of the unit conduit from an inlet of one fluid suspending cavity S to an inlet of an adjoining fluid suspending cavities in this fluid processor is calculated as 0.0142 mL, and the volume of the effective running route formed of 15 unit conduits comes to be 0.213 mL.

Using this fluid processor 50, a first fluid a to be processed and a second fluid b to be processed, whose objective processing time T for a reaction is 1.42 seconds, are continuously fed from the fluid inlets E1 and E2, respectively, by means of a micropump said to have pump performance of 0.15 mL/sec in terms of a feed rate.

A discharge quantity (discharge rate) of the fluids to be processed actually discharged from the fluid outlet EX was measured and found to be 0.15 mL/sec.

This fact means that actual passing time T1 of the fluids to be processed in the effective running route is 1.42 seconds (0.213 mL÷0.15 mL/sec=1.42 seconds). After all, according to this fluid processor 50, process of the processing time which is the same or substantially the same as the objective processing time T can be conducted.

However, another micropump was used in another fluid processor having the same basic construction as the above fluid processor 50, and a discharge quantity (discharge rate) of the fluids to be processed actually discharged from the fluid outlet EX was measured and found to be 0.16 mL/sec.

This fact means that actual passing time T1 of the fluids to be processed in the effective running route in said fluid processor is 1.33 seconds (0.213 mL÷0.16 mL/sec=1.33 seconds). It is found that a difference of 0.09 seconds exist between the objective processing time T of 1.42 seconds. The reason for this is contributed to the performance of the micropump used and an error from the design value in the fluid processor 50.

Figure 17:
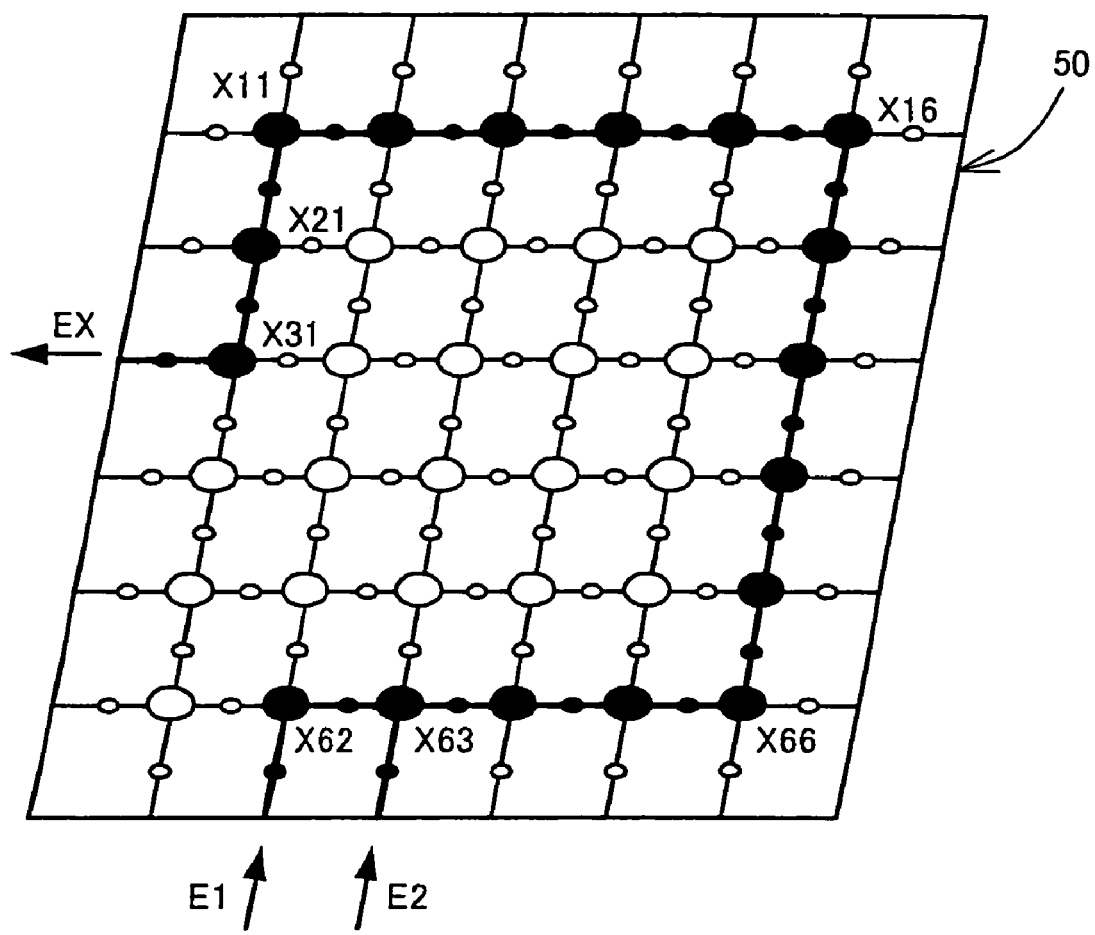
FIG. 17 is a perspective view illustrating a fluid processor in a state that in the case where the fluid processor in FIG. 15 is regarded as a precursor fluid processor, the temporary running route thereof has been corrected to set a running route for fluid process.

Accordingly, a valve V in a conduit portion directly linked with the intersection X21 from the peripheral edge of the base material was set to a closed state, and valves in a conduit portion from the intersection X21 to the intersection X31 and a conduit portion directly linked with the intersection X31 from the peripheral edge of the base material were set to an opened state as illustrated in FIG. 17, thereby obtaining a fluid processor that a corrected running route for fluid process has been set. When this fluid processor was used to feed the first fluid a to be processed and the second fluid b to be processed in the same manner as described above. As a result, the discharge rate of the fluids to be processed was also 0.16 mL/sec.

In the fluid processor by the corrected running route for fluid process, the passing time T1 was calculated as 1.42 seconds, since the volume of the effective running route is 0.228 mL.

It is accordingly understood that according to the fluid processor thus corrected, an intended process is surely conducted in expected process time because the passing time T1 substantially consists with the objective processing time T.

In the above, the fluid processor having the running route for fluid process before the correction and said running route for fluid process before the correction have meanings as a precursor fluid processor and a temporary running route, respectively. The fluids to be processed are passed through the temporary running route of the precursor fluid processor to find the passing time T1 required for the fluids to be processed to pass through the temporary running route from the actual discharge rate. This passing time T1 is compared with the objective processing time T to correct a part of the temporary running route according to a difference between both passing time and objective processing time, whereby a fluid processor that a running route for fluid process, through which an intended process is conducted, has been set, can be constructed.

According to the fluid processor that the running route for fluid process has been set by such procedure, accordingly, an intended process can be conducted in accurate processing time even if the amount of the fluids to be processed is extremely small. Particularly, this fluid processor is useful when fluids to be processed are liquid.

EFFECTS OF THE INVENTION

According to the device for fluid processor of the present invention, there can be provided a fluid processor that passage of a fluid in a micro conduit can be freely controlled by the valve control mechanism in the micro conduit.

According to the device of the present invention, a fluid running route can be set with a great degree of freedom by selectively controlling the states of valves related to the micro conduits making up the micro conduit network. As a result, a fluid processor, which will become, for example, a micro reactor capable of conducting a desired process, can be provided by the fluid running route thus obtained.

In other words, the devices according to the present invention have the so-called general-purpose fluid conduit system and can set a necessary reaction route according to the kind of a process to be conducted, so that a fluid processor adapted to an intended process is formed.

Accordingly, even when the device is a device of a single construction, necessary micro reactors are easily available according to the type of a process to be conducted by providing a plurality of devices for fluid processor, so that it is extremely convenient from the viewpoint of practical use.

According to the construction that the fluid suspending cavity has been formed at an intersection of the first micro conduit and the second micro conduit in the device, an effective contact effect, mixing effect or agitating effect is achieved as to 2 fluids to be processed in the fluid suspending cavity, and a sufficient contact process can be performed.

According to the running route setting apparatus of the present invention, a fluid processor capable of suitably conducting a desired process can be easily provided by giving a signal for setting a fluid running route in the computer to set a suitable fluid running route in the device.

The fluid processors according to the present invention are formed by the respective devices described above and useful as, in particular, micro reactors.

The fluid processor of the present invention is equipped with the device, which has the micro conduit network and can selectively set a fluid running route. The device is equipped with the stimulus application mechanism, whereby a variety of stimuli is applied to a fluid to be processed running in a fluid running route and/or being suspended in a fluid suspending cavity in a mode according to an intended micro-fluid process, so that setting of process conditions can be conducted corresponding to the intended micro-fluid process. Accordingly, the micro-fluid process can be conducted with an extremely great degree of freedom and high efficiency, and a variety of micro-fluid process can also be conducted.

According to the fluid processing method by a fluid processor of the present invention, a running route for fluid process is set according to the length of objective processing time to conduct an intended process to a fluid to be processed in the device having a micro conduit network capable of selectively setting a fluid running route, thereby constructing a fluid processor, and a process to the fluid to be processed can be conducted by this fluid processor. Therefore, the fluid to be processed is passed in a state that the passing time thereof has been strictly and precisely controlled. As a result, the actual processing time of the fluid to be processed can be set to substantially same with the objective processing time, and an expected process can thus be surely conducted on a minute amount of the fluid to be processed.

In the device, a precursor fluid processor that a temporary running route has been set according to the length of objective processing time is formed to find the passing time required for the fluid to be processed to pass through the temporary running route, and the passing time is compared with the objective processing time to correct, for example, at least a part of the temporary running route, thereby constructing a fluid processor in which a running route for fluid process has been set. Therefore, a state that the actual processing time of the fluid to be processed has been made to substantially same with the objective processing time is realized by using this fluid processor, and an expected process can thus be surely conducted on a minute amount of the fluid to be processed.

In the above, the passing time of the fluid to be processed is found by a velocity of the out flowing fluid from the fluid outlet of the temporary running route and a volume of the temporary running route, whereby a running route for fluid process in a state that the length of the processing time strictly and precisely consists with the objective processing time can be set.

The intended process as to the fluid to be processed may be a reaction process of plural kinds of fluids, thermal process or radiation irradiating process, whereby the expected process on the fluid to be processed can be conducted in a length corresponding to the objective processing time.

The invention claimed is:

1. A device for a fluid processor comprising:
   a plate-shaped base material;
   a micro conduit completely enclosed within the plate-shaped base material, configured to pass fluid formed in the base material so as to extend in a plane direction thereof;
   a valve completely enclosed within the plate-shaped base material, configured to open and close the micro conduit, and including a spherical space forming a valve chamber with a valve particle that includes a magnetizable material; and
   a valve control mechanism, configured to change a position of the valve particle with respect to an opening of the micro conduit linked with the valve chamber to control the valve between a closed state and an opened state, said valve control mechanism including a magnetizable film attached to a top surface of the plate-shaped base material and configured to apply a magnetic field to the valve particle to change the position of the valve particle, wherein the state of the valve is controlled by the valve control mechanism to form the fluid processor.

2. The device for a fluid processor according to claim 1, wherein the spherical valve chamber includes first and second micro conduit openings, the first micro conduit opening being arranged at a portion of the spherical chamber closest to the magnetizable film, the second micro conduit opening being arranged at a portion of the spherical chamber that is more distant from the magnetizable film.

3. A device for a fluid processor comprising:
   a plate-shaped base material;
   a micro conduit completely enclosed within the plate-shaped base material, configured to pass fluid formed in the base material so as to extend in a plane direction thereof;
   a valve completely enclosed within the plate-shaped base material, configured to open and close the micro conduit, and including a spherical space forming a valve chamber with a valve particle that includes an electronically charged material; and
   a valve control mechanism, configured to change a position of the valve particle with respect to an opening of the micro conduit linked with the valve chamber to control the valve between a closed state and an opened state, said valve control mechanism including an electric field producing film attached to a top surface of the plate-shaped base material and is configured to apply an electric field to the valve particle to change the position of the valve particle,
   wherein the state of the valve is controlled by the valve control mechanism to form the fluid processor.

4. A device for a fluid processor according to claim 3, wherein the spherical valve chamber includes first and second micro conduit openings, the first micro conduit opening being arranged at a portion of the spherical chamber closest to the magnetizable film, the second micro conduit opening being arranged at a portion of the spherical chamber that is more distant from the magnetizable film.

* * * * *